United States Patent [19]

Frank et al.

[11] Patent Number: 4,622,631
[45] Date of Patent: Nov. 11, 1986

[54] DATA PROCESSING SYSTEM HAVING A DATA COHERENCE SOLUTION

[75] Inventors: Steven J. Frank, Mountain View; J. Scott Merritt, Newark, both of Calif.

[73] Assignee: Plexus Computers, Inc., San Jose, Calif.

[21] Appl. No.: 567,233

[22] Filed: Dec. 27, 1983

[51] Int. Cl.[4] .............................................. G06F 15/16
[52] U.S. Cl. ................................................. 364/200
[58] Field of Search ................. 364/200 MS File, 200

[56] References Cited

U.S. PATENT DOCUMENTS 4,141,067  2/1979  McLagan .......................... 364/200

Primary Examiner—Raulfe B. Zache
Attorney, Agent, or Firm—Fliesler, Dubb, Meyer & Lovejoy

[57] ABSTRACT

A tightly coupled computer system which provides for data coherency and includes an addressable main memory for storing blocks of data, a plurality of processors for accessing the blocks of data, each of the processors having an addressable cache memory for storing a number of blocks of data, a bus for intercoupling the plurality of processors with the addressable main memory and for intercoupling each of the plurality of processors with any other of the plurality of processors, and wherein only one of the plurality of processors and addressable main memory is a current owner of an address of a block of data, wherein the current owner has the correct data for the owned address, and wherein the ownership of an address is dynamically changeable among the addressable main memory and the plurality of processors.

49 Claims, 42 Drawing Figures

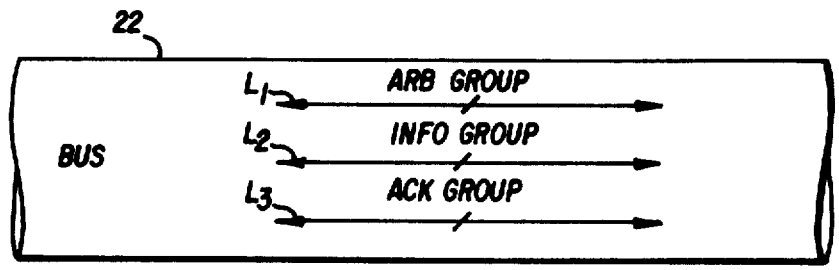

FIG. 4E    WRITE MODIFIED OR WRITE NEW DATA

| RELATIVE TIME SLOT | 1 | 2 | 3 | 4 | 5 | 6 | 7 | |
|---|---|---|---|---|---|---|---|---|
| ARB GROUP | ARB | HOLD | HOLD | HOLD | HOLD | | | |
| INFO GROUP | | COMMAND ADDRESS | COMMAND DW$_0$ | COMMAND DW$_1$ | COMMAND DW$_2$ | COMMAND DW$_3$ | | |
| ACK GROUP | | | | ACK (ADDRESS) | ACK (DW$_0$) | ACK (DW$_1$) | ACK (DW$_2$) | ACK (DW$_3$) |

FIG. 4F    WRITE MODIFIED

| RELATIVE TIME SLOT | 1 | 2 | 3 | 4 | 5 | 6 | 7 |
|---|---|---|---|---|---|---|---|
| ARB GROUP | ARB | | | | | | |
| INFO GROUP | | COMMAND ADDRESS | | | | | |
| ACK GROUP | | | | ACK (ADDRESS) | | | |

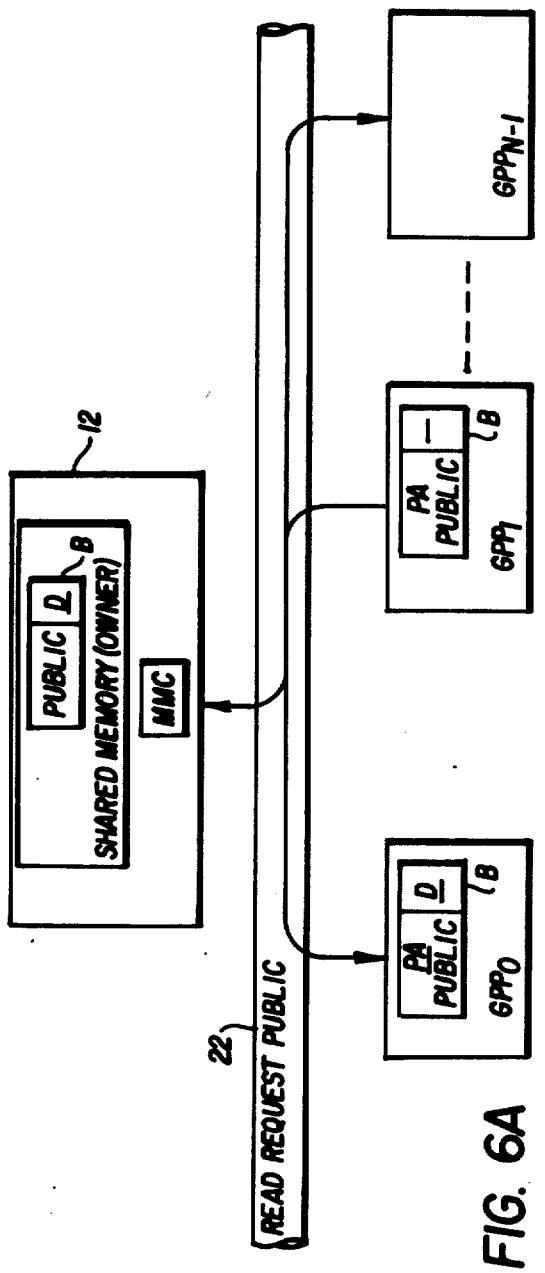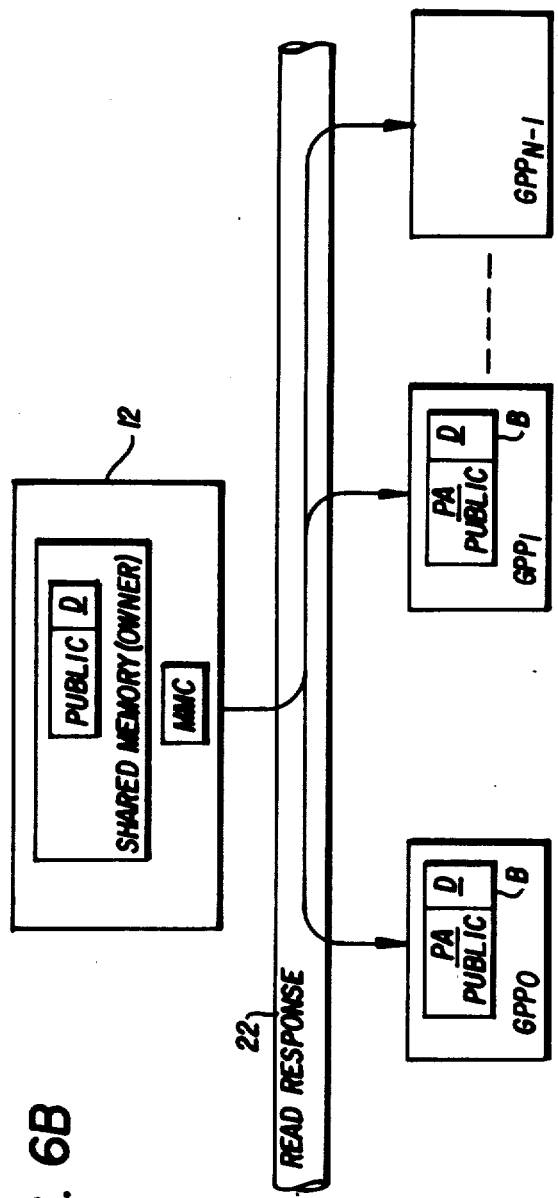

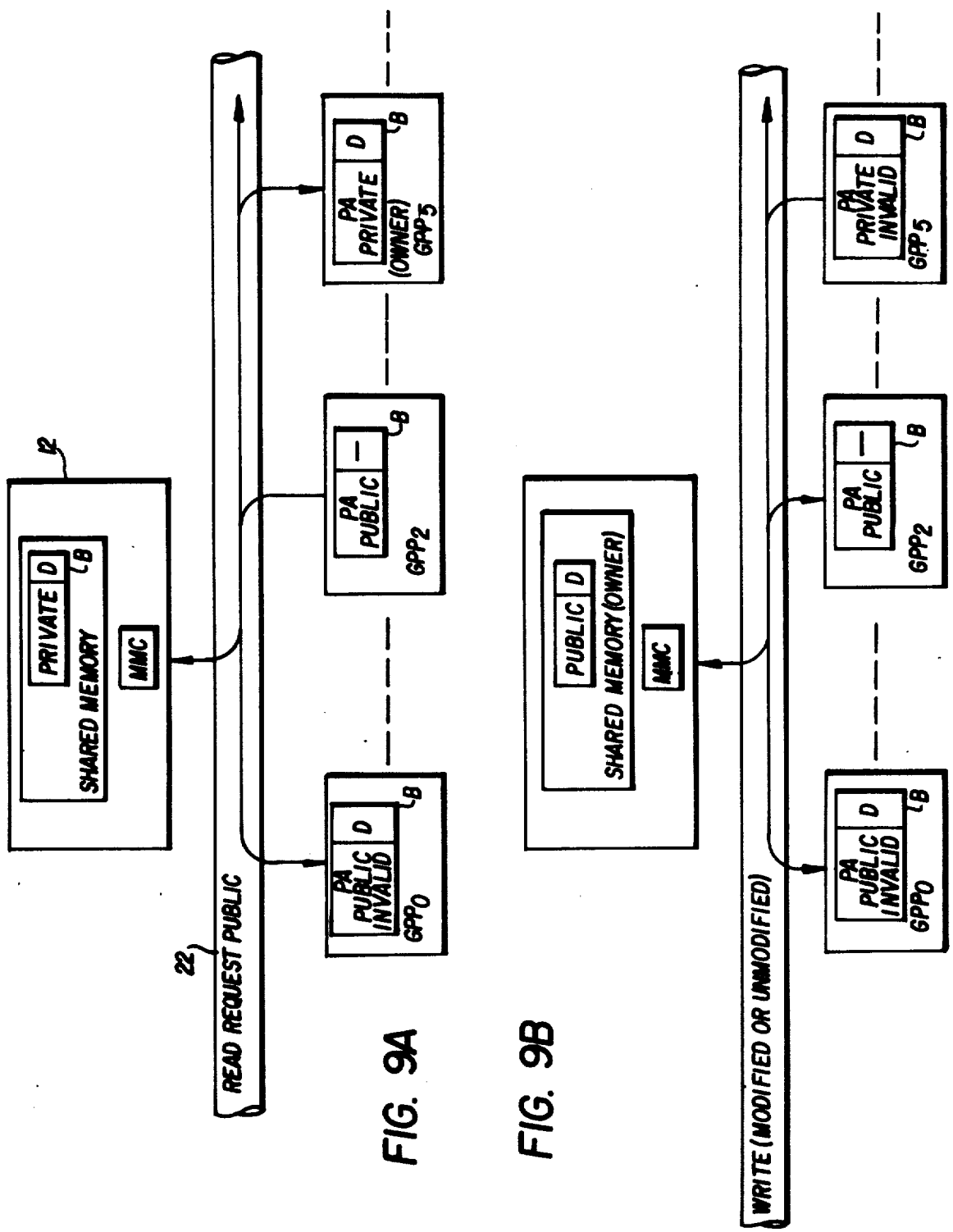

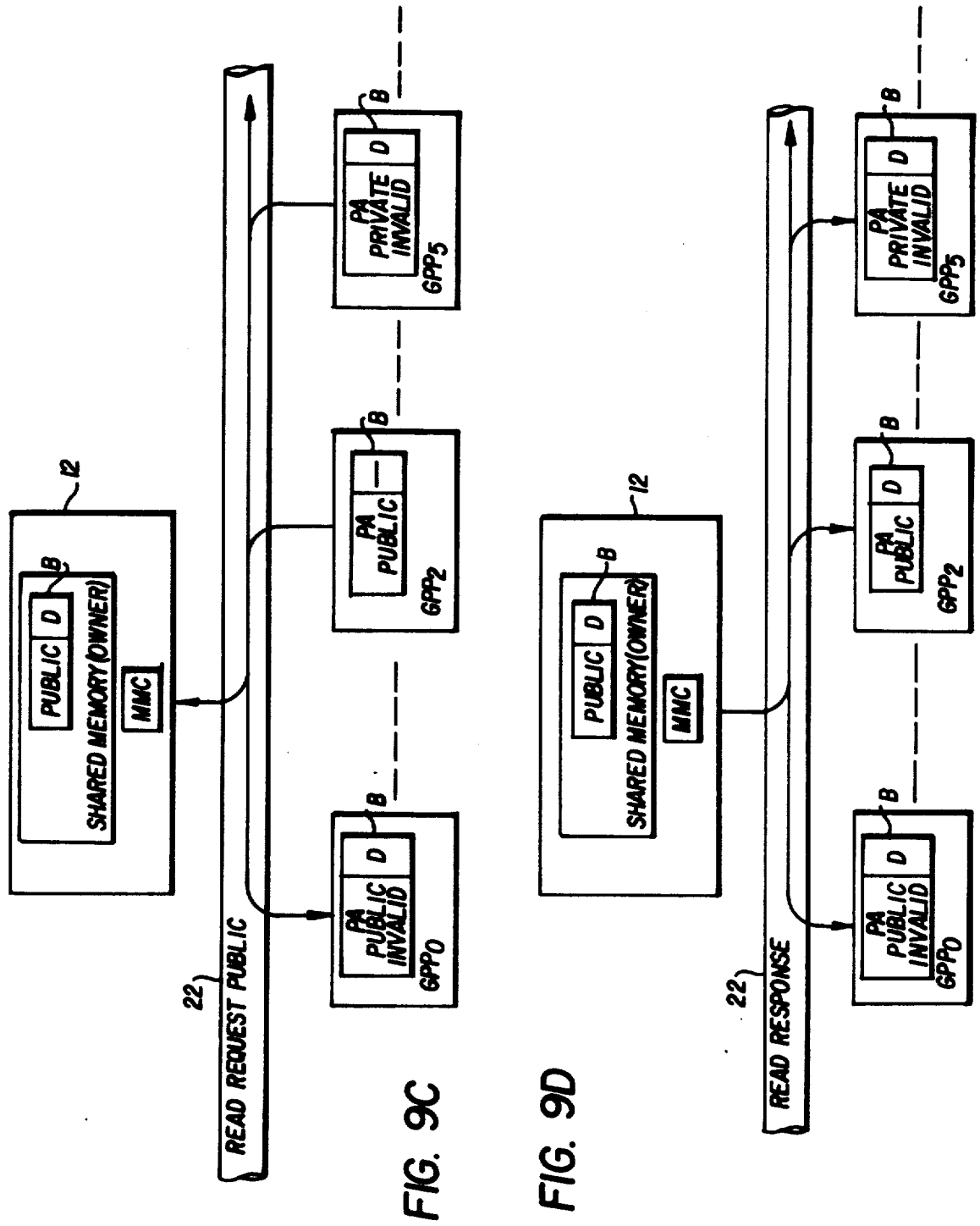

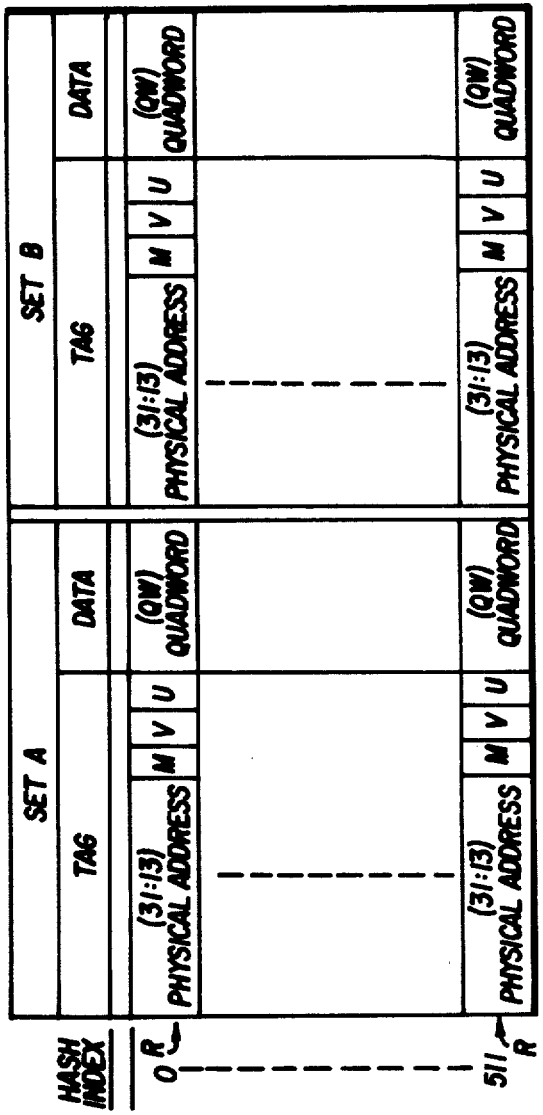

CACHE ENTRY MODIFIED

FIG. 18

| NEXT ADDRESS FIELD | MICROENGINE DATA PATH CONTROL | CACHE AND ATU TAG CONTROL | DATA PATH CONTROL | EXPANSION BUS CONTROL AND MONITOR |

FIG. 18A

NEXT ADDRESS FIELD

| NEXT ADDRESS (10 BITS) | NEXT ADDR. CONTROL (2 BITS) |

MICROENGINE DATA PATH CONTROL FIELD

| OPCODE (TO 38-9) | CONDITION TEST (TO 38-6) | COUNTER CONTROL (TO 38-10) | SCRATCH RAM CONTROL (TO 38-8) | SCRATCH RAM ADDRESS MUX (TO 38-7) | OUTPUT ENABLE (TO 38-11) |

FIG. 18B

CACHE AND ATU TAG CONTROL FIELD

| CACHE REPLACEMENT | DATA CACHE TAG WRITE | ATU TAG WRITE | ATU TAG REGISTER ENABLE | ATU TAG RAM ENABLE |
| ↓ 32-5A,5B | ↓ 32-5A,5B | | | |

FIG. 18C

MAIN DATA PATH CONTROL

| CACHE CONTROL | HOLD μ SUBSYSTEM | CACHE DATA PATH CONTROL | CACHE RAM CONTROL | ADDRESS GENERATION | LA BUS SOURCE |
| ↓ 32-11 | ↓ 30-2 | ↓ CM | ↓ CM | ↓ 32-1A,1B | |

FIG. 18D

EXPANSION BUS CONTROL AND MONITOR

| X BUS COMMAND | X BUS ARB + TRANSMIT | ID ENABLE | MONITOR TAG UPDATE | MONITOR INVALIDATE | MONITOR STATUS |
| ↓ 34-8 | ↓ 34-8 | ↓ RID | ↓ 34-8 | | ↓ 34-16 |

FIG. 18E

READ RESPONSE TO PRIVATE REQUEST

FLUSH CACHE ENTRY

DATA PROCESSING SYSTEM HAVING A DATA COHERENCE SOLUTION

TECHNICAL FIELD

The present invention relates generally to a system for processing data and, more particularly, to a tightly-coupled computer system, having data coherency, for processing data, together with processors and a bus structure of the computer system.

BACKGROUND ART OF THE INVENTION

Computer systems in general, and special purpose computer systems in particular, have been developed to maximize the through-put of data, as well as increase data integrity and overall data processing capability. One class of computer systems that is designed for these objectives is based on a computer system architecture which has a number of data processors, i.e., a multiprocessor architecture. This class of computer system architecture is categorized by the manner in which the multiple data processors communicate, which includes "loosely coupled" systems, "moderately coupled" systems, and "tightly coupled" systems. For example, a tightly coupled system employs a common or shared memory, such as a random access memory (RAM), for the storage of data, and a number of data processors that access the data stored in the shared memory. Communication, including the transfer of data, between the data processors and the shared memory, and among the data processors themselves, is performed via a bus structure ("bus") which carries control signals, addresses of blocks of data and the data.

To improve system performance, memory hierarchies are used in computer systems, e.g., in the form of cache or secondary memories in conjunction with the shared or main memory. Each data processor may have a cache memory which temporarily stores copies of the data that are being accessed by the processor. The system performance is improved because the copies of the data that are stored in the cache memory can be accessed by the data processor in much less time than if the same data had to be accessed from the shared memory.

A system design issue related to the use of memory hierarchies concerns "bus bandwidth" or bus utilization. In most computer systems, the bus is bandwidth limited, so that it is important to minimize the use of the bus by each data processor, particularly for a computer system having a large number of processors coupled to the bus. One technique for minimizing the utilization of the bus is based on a cache memory algorithm known as "non-write-through", as opposed to a "write-through" algorithm. Specifically, if data to be accessed by a given data processor are not present in the corresponding cache memory, a copy of the data is obtained from the shared memory and stored in the cache memory. Thereafter, all accesses (read and write) to this data are made by the data processor to the cache memory, until such time as this data and other data previously stored in the cache memory are not currently needed, and still other data not present in the cache memory have to be accessed. At this time, the data processor writes that data which had been modified by the processor while stored in the cache memory back to the shared memory. Data which had not been so modified need not be written back to the shared memory, but are merely invalidated in the cache memory, thereby making the corresponding storage location available for the storage of copies of other data accessed from the shared memory. The bus utilization is minimized, using the non-write-through algorithm, since the modified data are not transferred from the cache memory to the shared memory after every write access in the cache memory, but only periodically when the data are no longer being used and other data must be transferred to the cache memory. By comparison, in accordance with the write-through algorithm, the modified data are transferred to the shared memory after each write access in the cache memory, thereby increasing the bus utilization.

The use of a memory hierarchy introduces a problem known as "data coherency." A computer system is data coherent if the data that are accessed by a processor are always the data last written to the address of that data. The problem of data coherency is enhanced in computer systems employing a non-write-through algorithm.

For example, assume that a computer system has a shared memory and two data processors, each having a cache memory, and all of which are coupled together over a common bus. Also, assume that A is the address of data D that are currently stored only in the shared memory. Thereafter, assume, for example, that one data processor $P_1$ has acquired a copy of the data D of that address A from the shared memory, modified the data D to data D' and stored data D' in its cache memory. Then assume the other data processor $P_2$ acquires a copy of the data D from the shared memory to read the data D. The result will be a violation of data coherency, since, for example, upon a read access by the one processor $P_1$ to its cache memory, the data D' will be read and upon a read access by the other processor $P_2$ to its cache memory the data D will be read. The data coherency problem is enhanced when non-write-through is employed, since the cache memory of the processor $P_1$ will continue to store data D' for a period of time, during which time the other processor $P_2$ may access the stale data D from the shared memory and read that data D from its cache memory.

Several practical or commercial computer systems employing a memory hierarchy have been developed and provide for data coherency. In one system, such as the UNIVAC 1100/80 Series, multiple data processors use a single shared cache memory. One problem with this technique is that the bandwidth of the single shared cache memory may not be sufficient to support a large number of data processors. In addition, longer access time delays are incurred, since the single shared cache memory cannot be physically close to all the data processors in the computer system.

In another type of practical computer system, such as the IBM 3033 Series manufactured by IBM Corporation, Armonk, N.Y., each data processor has its own cache memory. When a processor performs a write access to data D of an address A in its cache memory, the processor broadcasts the address A to all other processors. If the same address A is in one or more of the cache memories of these other processors, the corresponding data D in the cache memories are invalidated. One disadvantage with this type of computer system is the increase in bus utilization that is required to broadcast the address A over the bus each and every time such a write access occurs.

Yet in another type of practical computer system, such as the Honeywell Series 66, and the ELXSI 6400

Series, software control is used in an attempt to guarantee data coherency. A number of addresses of specified data, such as semaphores or job queues, are designated non-cacheable and can only be accessed from the shared memory. One disadvantage of the use of non-cacheable data is that the access time for the processor to access the non-cacheable data in the shared memory is substantially increased. An additional disadvantage to this technique is that the computer system, and in particular, the caching mechanism, is no longer transparent to the software.

Two other conceptual solutions to the data coherency problem have been proposed, and neither of these is believed to have been developed or commercialized. One solution is generally discussed in a paper entitled "A New Solution To Coherence Problems In Multicache Systems," by Censier and Feautrier, IEEE Transactions On Computers, Volume C-27, No. 12, December 1978. In this concept, the shared memory maintains flags for keeping track of individual blocks of data being processed throughout the system to prevent inconsistencies in the data. The flags that are used are called PRIVATE, PRESENT and MODIFIED and have the following properties: (1) if PRESENT is set in the shared memory for a block of data D and a cache memory K, then a valid copy of data D is in cache memory K; (2) if MODIFIED is set in the shared memory for the block of data D, then a valid copy of data D is stored in some cache memory and has been modified in that cache memory since the latest update of the shared memory; (3) if PRIVATE is set in a cache memory K for a valid block of data D, then no copies of data D are in any other cache memories, which implies that there is exactly one PRESENT flag set for that data D in the shared memory; and (4) if PRIVATE is reset in a cache memory K for a valid block of data D, then the data D in that cache memory K are identical to the data D in the shared memory, which implies that MODIFIED is reset for that data D.

As stated in Censier and Feautrier, the data access algorithms must be defined in such a way that the above four properties are always true, transition times being excepted. However, this exception presents a significant problem in terms of data coherency. That is, if the data access algorithms do not have to be true when given data D are in transit to one processor, i.e., on the bus, then, for example, a copy of this same data D which may be stored in a cache memory of another processor may be modified during this transit period by that other processor. The result is that the data D in transit may become stale and yet be accessed by the one processor. Moreover, another problem is the requirement that the shared memory keep track of all the data via the flags to maintain data coherency. This approach becomes infeasible for a computer system having a large number of processors, since an operation in a central location or central controller, i.e., the shared memory, is required, thereby resulting in substantial and complex hardware and algorithms for the central controller to perform the centralized control function, as well as system performance degradation.

Another publication entitled "Using Cache Memory To Reduce Processor-Memory Traffic," by James R. Goodman, Association for Computing Machinery, Tenth Annual Symposium on Computer Architecture, June, 1983, describes generally a concept for a multiprocessor computer system having memory hierarchy and data coherency schemes. Although Goodman is disclosed herein for background purposes and to help explain the present invention, this publication is not believed to be prior art. Goodman states that his approach has much in common with Censier and Feautrier, but allows the critical information for achieving data coherency to be distributed among the cache memories where it already resides. Furthermore, Goodman proposes a new scheme called "write-once" to solve the data coherency and bus bandwidth problems.

In Goodman, associated with each block of data D in a cache memory, in addition to addresses of the data D, are two bits defining one of four states for the associated data D, including (1) INVALID, (2) VALID, (3) RESERVED, and (4) DIRTY. If INVALID, there are no data D in the block; if VALID there are data D in the block which have been read by the corresponding processor from the shared memory but which have not been modified; (3) if RESERVED, the data D in the block have been locally modified by the processor exactly once since the data D were stored in the cache memory and the change has been transmitted to the shared memory; and if DIRTY the data D in the block have been modified by the processor more than once since the data D were stored in the cache memory and the latest change has not been transmitted to the shared memory. Also, an additional copy of addresses of the cache memory is contained in and employed by a given processor. One such copy is used in a conventional way to support accesses to the cache memory by the processor and the other such copy is used to monitor all accesses to shared memory via the bus by other processors.

For each access by another processor to shared memory, the one processor monitors the address on the bus to check if that address is in its other copy of addresses. If a match is found by the one processor on a write access to shared memory by the other processor, the corresponding data in the cache memory are marked INVALID by the one processor. If a match is found by the one processor on a read access to shared memory by the other processor, nothing is done by the one processor unless the data have been modified, i.e., its state is RESERVED or DIRTY. If so modified, and if the data are just RESERVED, the state bits are changed to VALID by the one processor. If DIRTY, the one processor inhibits the shared memory from supplying the data to the other processor requesting the data. The one processor then supplies the requested data to the other processor and thereafter writes this data to shared memory. In addition, the state bits are changed to VALID by the one processor.

According to Goodman, data coherency is achieved in the following way. Initially, upon the other processor writing through on the bus for a write access to shared memory, only this other processor is guaranteed to have a copy of the data, except for the shared memory, since the one processor (and still all other processors in the system) will mark the data INVALID while the other processor will mark the data RESERVED. Thereafter, if another write access occurs for this data, such other processor will change the flag from RESERVED to DIRTY.

Thus, in accordance with Goodman, each processor is responsible for maintaining data coherency for those cases where a violation can occur, i.e., whenever a write access is made to a given address, thereby distributing the data coherency function. One problem with Goodman, is that the processor having given data D can only modify that data once and then must write that data back to shared memory (write once), thereby increasing bus utilization. Furthermore, being conceptual, Goodman does not solve the data coherency problem that arises under a number of different conditions in a practical or fully developed computer system.

SUMMARY OF THE INVENTION

It is an object of the present invention to provide a data processing system having data coherency.

Another object of the present invention is to provide a practical multiprocessor computer system having a memory hierarchy that provides for data coherency.

Yet another object of the present invention is to provide a tightly coupled multiprocessor computer system having a memory hierarchy and which provides for data coherency.

Still another object of the present invention is to provide processors and a bus structure for supporting data coherency in an overall data processing system.

The above and other objects of the present invention are obtained through the use of a system for processing data partitioned into blocks of data, each block being identified by an address, comprising addressable main memory means for storing the blocks of data, a plurality of processor means for accessing the blocks of data, each of the processor means having addressable secondary memory means for storing a number of the blocks of data, bus means for intercoupling the plurality of processor means with the addressable main memory means, and for intercoupling each of the plurality of processor means with any other of the plurality of processor means, and in which only one of the addressable main memory means and the plurality of processor means is a current OWNER of an address of a block of data, wherein the current OWNER has the correct data for the owned address, and wherein ownership of an address is dynamically changeable among the addressable main memory means and the plurality of processor means.

In addition, each block of data has associated with it usage mode information identifying the use, PUBLIC or PRIVATE, that can be made of the corresponding block of data. If the usage mode is PUBLIC, then the properties are such that (1) the addressable main memory means is the current OWNER of the corresponding address, (2) the plurality of processor means may store in the addressable secondary memory means, respectively, valid copies of the data of the current owned address, and (3) the addressable main memory means and the plurality of processor means cannot modify the data of the current owned address. If the usage mode is PRIVATE, the properties are such that (1) the current OWNER of the address can modify the data, and (2) the addressable main memory means and the plurality of processor means, other than the current OWNER, have no valid copies of the data of the current owned address. Based on these ownership and usage properties, the data processing system of the present invention will provide for data coherency at all times, and data which are PRIVATE can be modified by a given processor means any number of times without having to write such data back to the addressable main memory means. In addition, the solution to the data coherency problem is distributed about the data processing system, rather than being centralized in a central controller or other device.

In still another aspect for carrying out the above-mentioned objects, the present invention includes a bus for supporting a plurality of bus transactions among an addressable main memory means for storing blocks of data and a plurality of processor means for processing the data, each of the plurality of processor means having a secondary memory means for storing a number of blocks of the data, the addressable main memory means and one or more of the plurality of processor means being connectable to the bus, each block of data having associated with it an address and a usage mode of PUBLIC or PRIVATE identifying the use that can be made of the data, the bus carrying command data identifying the plurality of bus transactions, the command data comprising: a READ REQUEST PUBLIC being a bus transaction for acquiring and reading the data; a READ REQUEST PRIVATE being a bus transaction for acquiring ownership of an address and modifying the data; a READ RESPONSE being a bus transaction for responding to a READ REQUEST PUBLIC or a READ REQUEST PRIVATE; a WRITE MODIFIED being a bus transaction for transferring modified data and ownership of an address to the addressable main memory means; and a WRITE UNMODIFIED being a bus transaction for transferring ownership of an address to the addressable main memory means.

The command data may further include a WRITE NEW DATA being a bus transaction for writing new data and transferring ownership of an address to the addressable main memory means.

In another aspect for carrying out the above-mentioned objects, the present invention further includes a processor for connection to a computer system having an addressable main memory means for storing blocks of data, each block of data being identified by a unique address, at least one other processor, and a bus supporting a plurality of bus transactions and intercoupling each processor with one another and intercoupling each processor with the addressable main memory means, the processor comprising: addressable cache memory means for storing a number of blocks of data and addresses of the number of blocks of data; processor subsystem means for accessing said addressable cache memory means to read or write data, the addressable cache memory means generating a cache status signal identifying a cache hit or a cache miss; bus interface means for coupling blocks of data between the addressable cache memory means and the bus, the bus interface means including means for monitoring the plurality of bus transactions on the bus and generating a bus monitor status signal identifying the plurality of bus transactions; and microengine means for initiating the plurality of bus transactions, respectively, in response to the cache miss status signal or in response to the bus monitor status signal.

BRIEF DESCRIPTION OF THE DRAWINGS

FIG. 4A illustrates the bus and a signal level protocol carried on by the bus of the present invention;

FIG. 4B is used to explain generally the signal level protocol for any bus transaction;

FIG. 4C-FIG. 4F are used to explain specifically the signal level protocol for each of the bus transactions;

FIG. 6A-FIG. 6B are used to explain further a READ REQUEST PUBLIC bus transaction and READ RESPONSE bus transaction, respectively, of the present invention;

FIG. 9A-FIG. 9D are used to explain still further READ REQUEST PUBLIC and READ RESPONSE bus transactions of the present invention;

FIG. 13 illustrates a cache memory organization;

FIG. 14 shows a physical address PA;

FIG. 15 shows a logical address LA;

FIG. 18 illustrates a microinstruction used in the present invention;

FIG. 18A-FIG. 18E shows subfields of respective fields of a microinstruction;

DETAILED DESCRIPTION OF THE INVENTION

Figure 1:
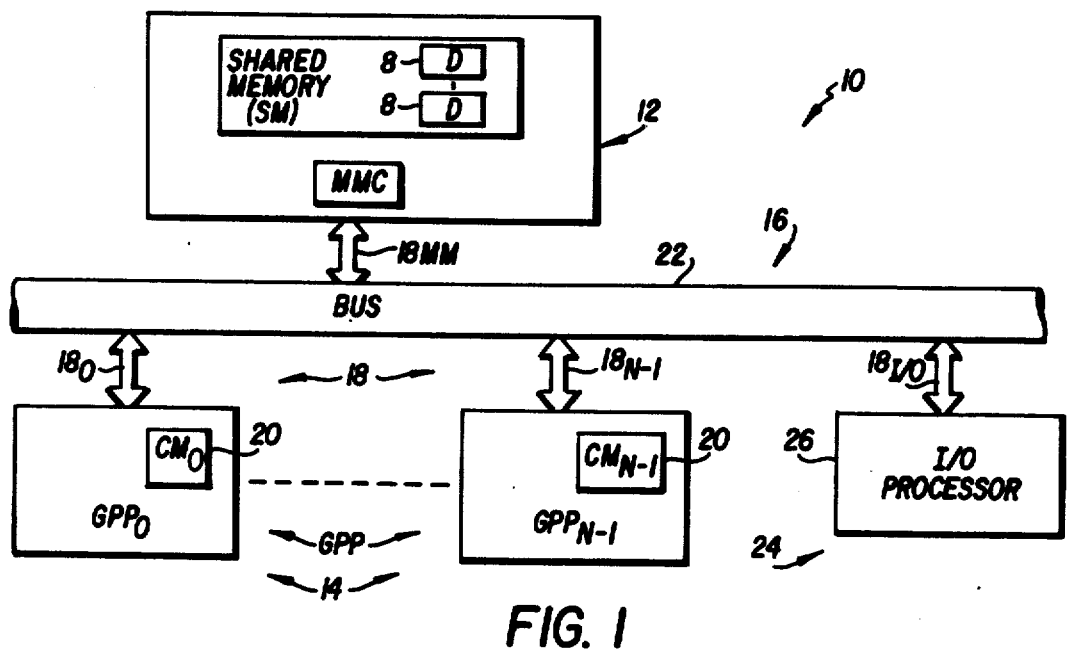
FIG. 1 is a block diagram of the architecture of a data processing system of the present invention.

FIG. 1 shows generally the architecture of a system 10 for processing data that are partitioned into blocks of data D shown generally at B. The system 10 has an addressable main memory means 12 for storing the blocks B and a plurality of processor means 14 for accessing the blocks B stored in the addressable main memory means 12 or elsewhere in the system 10, as will be further described. A bus means 16 intercouples the plurality of processor means 14 with the addressable main memory means 12 and intercouples each one of the plurality of processor means 14 with any other of the plurality of processor means 14 via respective paths shown generally at 18. Each of the processor means 14 has an addressable secondary memory means shown generally at 20 for storing a number of the blocks B that are processed by the system 10.

While the principles of the present invention apply to any type of data processing system 10, the system 10 will be described as a tightly-coupled computer system 10. Thus, addressable main memory means 12 includes a main or shared memory SM that is shared by the plurality of processor means 14, together with a main memory controller MMC which controls access to the shared memory SM. The plurality of processor means 14 preferably are general purpose processors GPP, e.g., processors $GPP_0-GPP_{N-1}$, where N is the number of general purpose processors GPP, and the secondary memory means 20 preferably are cache memories CM, e.g., cache memories $CM_0-CM_{N-1}$, respectively, which provide for rapid access to the data stored therein. The bus means 16 constitutes an "expansion" bus 22 which supports various bus transactions and signal protocols, as will be further described below. The bus 22 is an "expansion" bus in the sense that computer system 10 will support at least two GPPs and additional GPPs up to N which can be coupled to the bus 22 to expand the data processing capability of the computer system 10. As shown, therefore, the general purpose processors $GPP_0-GPP_{N-1}$ are coupled to the bus 22 via respective paths $18_0-18_{N-1}$ while the addressable main memory means is coupled to the bus 22 via the path 18MM.

The computer system 10 can also include another type of processor means 24 in addition to the plurality of general purpose processors GPP. Processor means 24 includes at least one input/output (I/O) processor 26, coupled to the bus 22 via a path 18 I/O, for storing new data in the shared memory SM.

Figure 2:
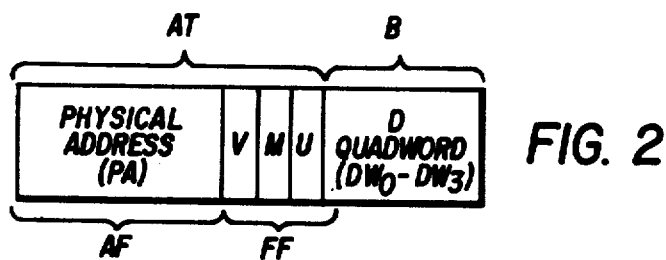
FIG. 2 illustrates information processed by the data processing system of FIG. 1.

FIG. 2 illustrates information that is processed by the overall system 10, including a typical block B of data D. As one example, and as indicated in FIG. 2, the data D of a block B comprise, and are transferred about the computer system 10, as a quadword QW having four data words $DW_0-DW_3$. Each data word $DW_0-DW_3$ can be, for example, 32 bits. Associated with each block B, though not necessarily transferred about computer system 10 with each block B is an address tag AT that includes a unique physical address PA of the data D and a flag field FF.

The flag field FF has three flags per block B, which are a validity flag V, a modify flag M and a usage mode flag U. The validity flag V, when set (VALID), indicates that the block B has data D associated with the corresponding physical address PA. When reset (INVALID), the validity flag V indicates that the data D of the block B are undefined. The modify flag M, when set (MODIFIED), indicates that the data D of the block B have been written by a corresponding processor GPP since stored in a cache memory CM and, when reset (UNMODIFIED), indicates that the data have not been so written.

The usage mode flag U, when reset, indicates that the corresponding physical address PA is PUBLIC, and, when set, indicates that the corresponding physical address PA is PRIVATE. As will be further described, if a physical address PA is stored in a cache memory $CM_0-CM_{N-1}$ and is PUBLIC, then the corresponding processor $GPP_0-GPP_{N-1}$ has only a read access to the associated data D. If the physical address PA is stored in a cache memory $CM_0-CM_{N-1}$ and is PRIVATE, then the corresponding processor $GPP_0-GPP_{N-1}$ has read and write access to the associated data D.

Also, and as will be further described, the shared memory SM preferably will store the data D and the corresponding usage mode flag U, whereas each cache memory CM will store the entire address tag AT and block B shown in FIG. 2.

The computer system 10 provides for data coherency based on the principle of ownership of a physical address PA. At any instant, there is only one OWNER of a physical address PA throughout the computer system 10. That is, either the shared memory SM or one of the processors $GPP_0$–$GPP_{N-1}$ is the OWNER of the physical address PA. Furthermore, only the OWNER will have the correct or current data D for the owned physical address PA, and the ownership of the physical address PA is dynamically changeable among the shared memory SM and the general purpose processors $GPP_0$–$GPP_{N-1}$. By definition, therefore, the OWNER of a physical address PA always has the current value of the data D for that address PA.

Data coherency is also provided in accordance with the following rules. If the usage mode flag U is PUBLIC, then (1) the shared memory SM is the OWNER of the physical address PA and, therefore, has the correct data D for that address PA, (2) any cache memory $CM_0$–$CM_{N-1}$ may have a copy of the data D of that physical address PA and the copy is guaranteed to be correct, and (3) the value of the data D for that physical address PA cannot be modified by the processors $GPP_0$–$GPP_{N-1}$, so that only a read access can be made to the copy of the data D in a cache memory $CM_0$–$CM_{N-1}$.

If the usage mode flag U is PRIVATE, then (1) one of the processors $GPP_0$–$GPP_{N-1}$ is the OWNER of the physical address PA and can modify the data D of that address PA, i.e., both read and write accesses are allowed by the one processor $GPP_0$–$GPP_{N-1}$, (2) there are no other VALID copies of the data D of that physical address PA in the computer system 10, and (3) the one processor $GPP_0$–$GPP_{N-1}$ owning the physical address PA must relinquish ownership when another processor $GPP_0$–$GPP_{N-1}$ requests the data D of that address PA with a usage mode of PRIVATE, as will be further described.

Figure 3:
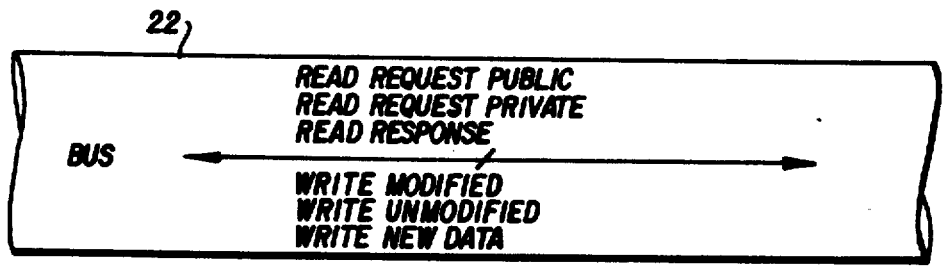
FIG. 3 illustrates a bus and a bus transaction protocol carried on by the bus of the present invention.

The overall computer system 10 and the bus 22, in particular, are structured and operate on the basis of three levels of protocol. One protocol is at a signal level, another protocol is at a bus transaction level, and yet another protocol is at an ownership level, which are, respectively, the lowest to the highest protocols. FIG. 3 illustrates the protocol of a plurality of bus transactions that are supported by the bus 22. These bus transactions are identified as (1) READ REQUEST PUBLIC, (2) READ REQUEST PRIVATE, (3) READ RESPONSE, (4) WRITE MODIFIED, (5) WRITE UNMODIFIED, and (6) WRITE NEW DATA. The bus transactions (1)–(5) can be initiated as commands by the processors $GPP_0$–$GPP_{N-1}$ and the bus transaction (6) can be initiated as a command by I/O processor 26. Each command (1)–(6) has certain information associated with it, e.g., a physical address PA or data D that is transmitted over the bus 22.

Generally, and as will be further described, the command READ REQUEST PUBLIC is generated or initiated by a requesting processor $GPP_0$–$GPP_{N-1}$ and transmitted over the bus 22 to acquire and store a copy of data D in its cache memory $CM_0$–$CM_{N-1}$ for read only access. The command READ REQUEST PRIVATE is initiated by a requesting processor $GPP_0$–$GPP_{N-1}$ and transmitted over the bus 22 to acquire ownership of a physical address PA and store a copy of corresponding data D in its cache memory $CM_0$–$CM_{N-1}$ for read and write accesses. For READ REQUEST PUBLIC and READ REQUEST PRIVATE, the command is transmitted on the bus 22 along with an address PA which is supplied by the requesting processor $GPP_0$–$GPP_{N-1}$. The command READ RESPONSE is initiated and transmitted over the bus 22 by the shared memory SM via main memory controller MMC or a responding processor $GPP_0$–$GPP_{N-1}$ to respond to the command READ REQUEST PUBLIC or READ REQUEST PRIVATE by sending the requested data D to the requesting processor $GPP_0$–$GPP_{N-1}$. The command WRITE MODIFIED is initiated by a processor $GPP_0$–$GPP_{N-1}$ and transmitted over the bus 22 to transfer an owned address PA and corresponding data D, which had been modified by such a processor $GPP_0$–$GPP_{N-1}$, to shared memory SM. The command WRITE UNMODIFIED is initiated by a processor $GPP_0$–$GPP_{N-1}$ and transmitted over the bus 22 to transfer an owned address PA of data D, which had not been modified by such a processor $GPP_0$–$GPP_{N-1}$, to shared memory SM but without transferring such data D. The command WRITE NEW DATA is initiated by the I/O processor 26 and transmitted over the bus 22 to transfer an address PA and input corresponding new data D into the shared memory SM.

FIG. 4A illustrates the signal level protocol that is supported by the bus 22 for each bus transaction (1)–(6) mentioned above. The signal level protocol is divided into three functional groups and includes (1) an arbitration group of signals ARB GROUP on signal lines $L_1$, (2) an information group of signals INFO GROUP on signal lines $L_2$, and (3) an acknowledge group of signals ACK GROUP on signal lines $L_3$. The ARB GROUP is first generated by an initiator of a bus transaction, e.g., by a processor $GPP_0$–$GPP_{N-1}$, to arbitrate for and acquire access to the bus 22. The INFO GROUP comprises, among other information to be described, the bus transaction command and physical address PA or data D which are exchanged over the bus 22, as described above, once the bus 22 has been so acquired by the bus transaction initiator. The ACK GROUP is produced by a recipient of the INFO GROUP to respond to receipt of the INFO GROUP. The content of the ACK GROUP, as will be further described, can be acknowledgement (ACK), no acknowledgement (NO ACK), or busy (BUSY). The total number of signal lines $L_1$, $L_2$ and $L_3$ comprises the bus 22, as will be described more fully below.

FIG. 4B illustrates the relative time slots during which the three functional signal groups of FIG. 4A are transmitted. For an INFO GROUP transmitted during a time slot n, the ARB GROUP and ACK GROUP are transmitted during time slots $n-1$ and $n+2$, respectively. The latter relative time slot is provided to give the recipient of the INFO GROUP time to evaluate the INFO GROUP and acknowledge, if at all, accordingly via the ACK GROUP. More details of the signal level protocol will be given below.

The ownership protocol, as indicated above, means that at any given time, only one of the processors $GPP_0$–$GPP_{N-1}$ and shared memory SM is the OWNER of a physical address PA of the corresponding data D. Four of the bus transactions (1)–(6) result in a transfer of ownership of an address PA and these are READ REQUEST PRIVATE, WRITE MODIFIED, WRITE UNMODIFIED and WRITE NEW DATA. The transfer of ownership of an address PA occurs only and immediately after ACK of the ACK GROUP indicating acknowledgement is produced in response to receipt of the INFO GROUP of one of these four bus transactions, e.g., one time slot or clock period after ACK is produced. As will be further described, a processor GPP indicates the transfer of ownership by acting on the validity flag V, i.e., resetting V to INVALID if the processor GPP is a current OWNER giving up ownership, and setting V to VALID if the processor GPP is the new OWNER. The shared memory SM indicates the transfer of ownership by acting on the usage mode flag U, i.e., setting U to PRIVATE when giving up ownership and resetting U to PUBLIC when acquiring ownership. The I/O processor 26 does not have to set or reset any flag. For the other two bus transactions, i.e., READ REQUEST PUBLIC and READ RESPONSE, ownership of an address PA is not transferred.

Generally, for the bus transaction or command READ REQUEST PRIVATE, ownership of an address PA is transferred from the current OWNER, which may be the shared memory SM or a responding processor $GPP_0$–$GPP_{N-1}$, to the initiating or requesting processor $GPP_0$–$GPP_{N-1}$ when ACK is made by the current OWNER via the ACK GROUP. If no such ACK is produced, then ownership is not transferred and the requesting processor $GPP_0$–$GPP_{N-1}$ must issue again the command READ REQUEST PRIVATE.

For the command WRITE MODIFIED, which is initiated only by a processor $GPP_0$–$GPP_{N-1}$ as the current OWNER, ownership of an address PA is transferred from the current OWNER to the shared memory SM when the ACK is produced by the shared memory SM via the ACK GROUP. If no such ACK is produced, then ownership is not so transferred, and the current OWNER must issue again the command WRITE MODIFIED. For the command WRITE UNMODIFIED, the transfer of ownership of an address PA is the same as the command WRITE MODIFIED.

For the command WRITE NEW DATA, which is initiated by the I/O processor 26, ownership of an address PA is taken from the current OWNER, i.e., one of the processors $GPP_0$–$GPP_{N-1}$, and transferred to the shared memory SM when the ACK is produced by the shared memory SM via the ACK GROUP. If no such ACK is produced, ownership is not transferred and the I/O processor 26 must initiate again the command WRITE NEW DATA.

As indicated above, when a requesting processor $GPP_0$–$GPP_{N-1}$ desires to acquire a copy of data D, a READ REQUEST PUBLIC or a READ REQUEST PRIVATE is initiated, depending on whether read only access or read/write accesses to the data D are needed. In response, the ACK GROUP is transmitted by the OWNER of the address PA of the desired data D, which may be the shared memory SM or another processor $GPP_0$–$GPP_{N-1}$. Therefore, shared memory SM can return to the requesting processor $GPP_0$–$GPP_{N-1}$, as part of its ACK GROUP, a 2-bit signal SM-ACK indicating either acknowledgement (ACK) or busy (BUSY), while the processors $GPP_0$–$GPP_{N-1}$ can return to the requesting processor $GPP_0$–$GPP_{N-1}$, as part of its ACK GROUP, a 2-bit signal CM-ACK indicating acknowledgement (ACK), no acknowledgement (NO ACK), or busy (BUSY). TABLE I below lists the ACK GROUP that might be returned by a processor $GPP_0$–$GPP_{N-1}$ and shared memory SM in response to a READ REQUEST PUBLIC or a READ REQUEST PRIVATE.

TABLE I

| | GPP (CM-ACK) | Shared Memory (SM-ACK) |
|---|---|---|
| A. | NO ACK | ACK |
| B. | NO ACK | BUSY |
| C. | ACK | ACK |
| D. | ACK | BUSY |
| E. | BUSY | ACK |
| F. | BUSY | BUSY |

Line A of TABLE I means that the address PA of the READ REQUEST PUBLIC or READ REQUEST PRIVATE is not owned by any $GPP_0$–$GPP_{N-1}$ and, therefore, must be owned by shared memory SM. The shared memory SM is committed to transfer the requested data D via a READ RESPONSE command. Line B of Table I means the same as line A, except that the shared memory SM is busy and cannot respond at this time. The requesting processor $GPP_0$–$GPP_{N-1}$, therefore, will reissue the READ REQUEST PUBLIC or READ REQUEST PRIVATE.

Line C means that a processor $GPP_0$–$GPP_{N-1}$ is the OWNER of the address PA of the READ REQUEST PUBLIC or READ REQUEST PRIVATE and has accepted the request, thereby committing itself to a READ RESPONSE. The shared memory SM will discover that it does not own the address PA and then will discard the request. Line D is the same as line C, except that the shared memory SM is busy and, therefore, will discard the request.

Line E means that the address PA is owned by a processor $GPP_0$–$GPP_{N-1}$, which is busy and, therefore, has not accepted the request. The requesting processor $GPP_0$–$GPP_{N-1}$ will then reissue the READ REQUEST PUBLIC or READ REQUEST PRIVATE. The shared memory SM, while accepting the request, will find that it does not own the address PA and, therefore, will discard the request. Line F is the same as line E, except that the shared memory SM is busy and, therefore, will discard the request. The requesting processor $GPP_0$–$GPP_{N-1}$ will then reissue the READ REQUEST PUBLIC or READ REQUEST PRIVATE.

Table I also applies to the WRITE commands (MODIFIED, UNMODIFIED and NEW DATA), but only with respect to Line A and Line B. This is because for these commands data D or ownership of an address PA is being transferred from a processor GPP or I/O processor 26 to shared memory SM. If a processor GPP did produce ACK or BUSY pursuant to Line C-Line F, then an error condition would occur.

As previously indicated, the bus transactions or commands (1)-(6) are unidirectional on the bus 22, which also means that a plurality of bus transactions can be interleaved over the bus 22. For example, while a requesting processor $GPP_0$–$GPP_{N-1}$ is waiting for a READ RESPONSE to a READ REQUEST PUBLIC or READ REQUEST PRIVATE, another requesting processor $GPP_0$–$GPP_{N-1}$ or I/O processor 26 can initiate a bus transaction. This interleaving ability has the advantage of maximizing the utilization of the bus 22, but also presents a problem of data coherency, which is resolved in the following manner.

Assume, for example, that a first requesting processor $GPP_0$–$GPP_{N-1}$ initiates a READ REQUEST PRIVATE and that this has been accepted via ACK of CM-ACK or SM-ACK of the ACK GROUP by the OWNER of the address PA. Upon production of such ACK, as previously indicated, ownership of the address PA is transferred to the requesting processor $GPP_0$–$GPP_{N-1}$. Assume also that while the first requesting processor $GPP_0$–$GPP_{N-1}$ (and now new OWNER) is waiting for the READ RESPONSE by the now former OWNER of the address PA, i.e., that it is waiting particularly for receipt of the data D which will be in transit on the bus 22 via the INFO GROUP of the READ RESPONSE, another READ REQUEST PUBLIC or READ REQUEST PRIVATE, issued by another requesting processor $GPP_0$–$GPP_{N-1}$, is received by the now new OWNER or first requesting processor $GPP_0$–$GPP_{N-1}$. In this case, the new OWNER simply sends BUSY via CM-ACK of the ACK GROUP, so that the other requesting processor $GPP_0$–$GPP_{N-1}$ must retry the READ REQUEST PUBLIC or READ REQUEST PRIVATE.

Assume now that while the new OWNER or first requesting processor $GPP_0$–$GPP_{N-1}$ is waiting for the data D that will be in transit via the INFO GROUP of the READ RESPONSE, the WRITE NEW DATA, issued by the I/O processor 26, is received by the new OWNER for the same address PA and that the shared memory SM accepts this via the production of ACK of SM-ACK of the ACK GROUP. The new OWNER, i.e., the first requesting processor $GPP_0$–$GPP_{N-1}$, then immediately loses ownership of the address PA of the data D by resetting the validity flag V to INVALID. As previously mentioned, the address PA is now owned by the shared memory SM as a result of the WRITE NEW DATA. The first requesting processor $GPP_0$–$GPP_{N-1}$ still receives the data D via the INFO GROUP of the READ RESPONSE, but upon such receipt the data D are effectively discarded via INVALID for the flag V.

Assume now that the first requesting processor $GPP_0$–$GPP_{N-1}$ has initiated a READ REQUEST PUBLIC and is waiting for the data D via the INFO GROUP of a READ RESPONSE. Assume also that while waiting for the READ RESPONSE, a READ REQUEST PRIVATE or a WRITE NEW DATA is received by the first requesting processor $GPP_0$–$GPP_{N-1}$. As previously mentioned, the READ REQUEST PUBLIC is not a bus transaction that results in a change in ownership of the address PA. Therefore, upon acceptance of the READ REQUEST PRIVATE or WRITE NEW DATA by the shared memory SM via ACK of SM-ACK of the ACK GROUP, the first requesting processor $GPP_0$–$GPP_{N-1}$ has no ownership to lose, but nevertheless resets the validity flag V to INVALID. Also, the first requesting processor $GPP_0$–$GPP_{N-1}$ ultimately receives and processes the READ RESPONSE, but the data D are effectively discarded due to the resetting of the validity flag V to INVALID.

Assume now that one or more processors $GPP_0$–$GPP_{N-1}$ have PUBLIC copies of data D of an address PA and that a READ REQUEST PRIVATE or WRITE NEW DATA is received by these processors $GPP_0$–$GPP_{N-1}$ for that address PA. Upon acceptance of the READ REQUEST PRIVATE or WRITE NEW DATA by the shared memory SM via ACK of SM-ACK of the ACK GROUP, these processors $GPP_0$–$GPP_{N-1}$ invalidate the PUBLIC copies of the data D by resetting the validity flag V to INVALID.

FIG. 4C–FIG. 4G are charts illustrating in more detail than FIG. 4B the relative time slots of the ARB GROUP, the INFO GROUP and the ACK GROUP, as well as the content of the INFO GROUP, for the specified bus transactions. Generally, for the INFO GROUP for each time slot, the command determines the interpretation of the data field. Thus, FIG. 4C relates to the bus transaction READ REQUEST PUBLIC or READ REQUEST PRIVATE, indicating that the INFO GROUP contains the command and that the content of the data field is an address PA. FIG. 4D relates to the bus transaction READ RESPONSE, indicating that the INFO GROUP contains the command and that the content of the data field of one time slot is the data word $DW_0$ of the quadword QW, which is followed in respective time slots by the command and data words $DW_1$–$DW_3$. As also shown in FIG. 4C and FIG. 4D, the INFO GROUP includes a requestor identification (RID) field which contains a number identifying the particular requesting processor $GPP_0$–$GPP_{N-1}$. A responding processor $GPP_0$–$GPP_{N-1}$ or shared memory SM returns the RID of the requesting processor $GPP_0$–$GPP_{N-1}$, so that the latter can determine if it is the intended receiver of a READ RESPONSE.

FIG. 4E relates to the bus transaction WRITE MODIFIED or WRITE NEW DATA, indicating that the INFO GROUP contains the command and that the contents of the data fields of the respective time slots are the address PA followed by the data words $DW_0$–$DW_3$ of a quadword QW. FIG. 4F relates to the bus transaction WRITE UNMODIFIED, indicating that the INFO GROUP contains the command and that the content of the data field contains the address PA.

Figures 5A, 5B:
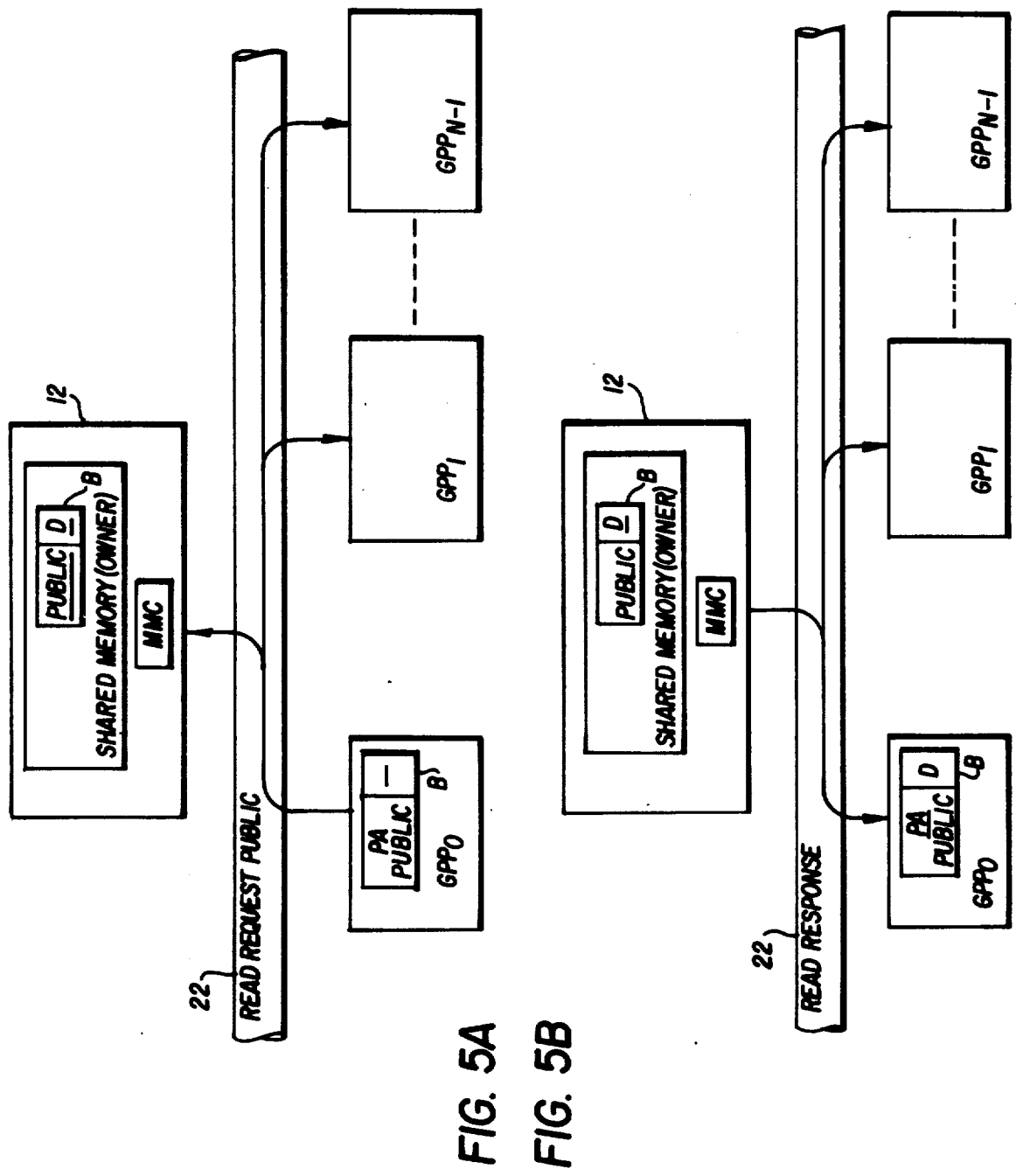
FIG. 5A-FIG. 5B show generally a READ REQUEST PUBLIC bus transaction and READ RESPONSE bus transaction, respectively, of the present invention.

FIG. 5A is used to explain overall and generally the bus transaction READ REQUEST PUBLIC. Assume that an address PA has a usage mode U of PUBLIC, so that, therefore, the shared memory SM is the OWNER of the address PA and has the correct data D, as shown in block B. Also assume that currently there are no other copies of the data D for that address PA throughout the computer system 10.

Now assume that one of the processors $GPP_0$–$GPP_{N-1}$, for example, processor $GPP_0$, desires a read only access to the data D. Therefore, processor $GPP_0$, after acquiring the bus 22 via the ARB GROUP, transmits the INFO GROUP shown in FIG. 4C over the bus 22, which is monitored by the processors $GPP_1$–$GPP_{N-1}$ and the shared memory SM (actually by the MMC). Since the shared memory SM is the OWNER of the address PA, and assuming that the shared memory SM is not busy, the ACK signal of SM-ACK of the ACK GROUP is sent by the shared memory SM over the bus 22 and received by the requesting processor $GPP_0$, which then sets the usage mode flag U to PUBLIC, thereby completing this bus transaction READ REQUEST PUBLIC.

FIG. 5B is used to explain the bus transaction READ RESPONSE, which, in the current example, will be a response to the READ REQUEST PUBLIC initiated by the requesting processor $GPP_0$, as described in FIG. 5A. After arbitrating for and receiving access to the bus 22 via the ARB GROUP, the INFO GROUP shown in FIG. 4D is transmitted by the shared memory SM and, upon receipt, acknowledged by the requesting processor $GPP_0$ via the ACK of CM-ACK of the ACK GROUP. The result is that the cache memory $CM_0$ of processor $GPP_0$ stores a VALID copy of the data D with a usage mode of PUBLIC, as shown in FIG. 5B. Thus, at the completion of the READ RESPONSE to the READ REQUEST PUBLIC, the shared memory SM remains the OWNER of the address PA and has the correct data D, and the processor $GPP_0$ has a VALID copy of the data D.

FIG. 6A and FIG. 6B are used to explain overall and generally the manner in which another processor $GPP_1$-$GPP_{N-1}$ can acquire read only access to the data D, assuming the ownership and usage mode of the address PA exist as shown in FIG. 5B. Assume, for example, that processor $GPP_1$ wants only to read the data D of the address PA; therefore, processor $GPP_1$ initiates the bus transaction READ REQUEST PUBLIC. Specifically, after arbitrating for and receiving access to the bus 22 via the ARB GROUP, requesting processor $GPP_1$ transmits the INFO GROUP shown in FIG. 4C. Being the OWNER of the address PA, and assuming it is not busy, shared memory SM transmits an acknowledgement via the ACK of SM-ACK of the ACK GROUP which is received by the requesting processor $GPP_1$ which then sets the usage mode flag U to PUBLIC.

Thereafter, as indicated in FIG. 6B, shared memory SM, after arbitrating for and receiving access to the bus 22 via the ARB GROUP, produces the INFO GROUP shown in FIG. 4D on the bus 22. The requesting processor $GPP_1$ then acknowledges receipt of the data D via the ACK of CM-ACK of the ACK GROUP. The result is that a copy of the data D is stored in the cache memory $CM_1$ with a usage mode of PUBLIC. Thus, at the completion of the READ RESPONSE shown in FIG. 6B, shared memory SM is the OWNER of the address PA and has the correct data D, and processor $GPP_0$ and processor $GPP_1$ have VALID copies of the data D.

Figures 7A, 7B:
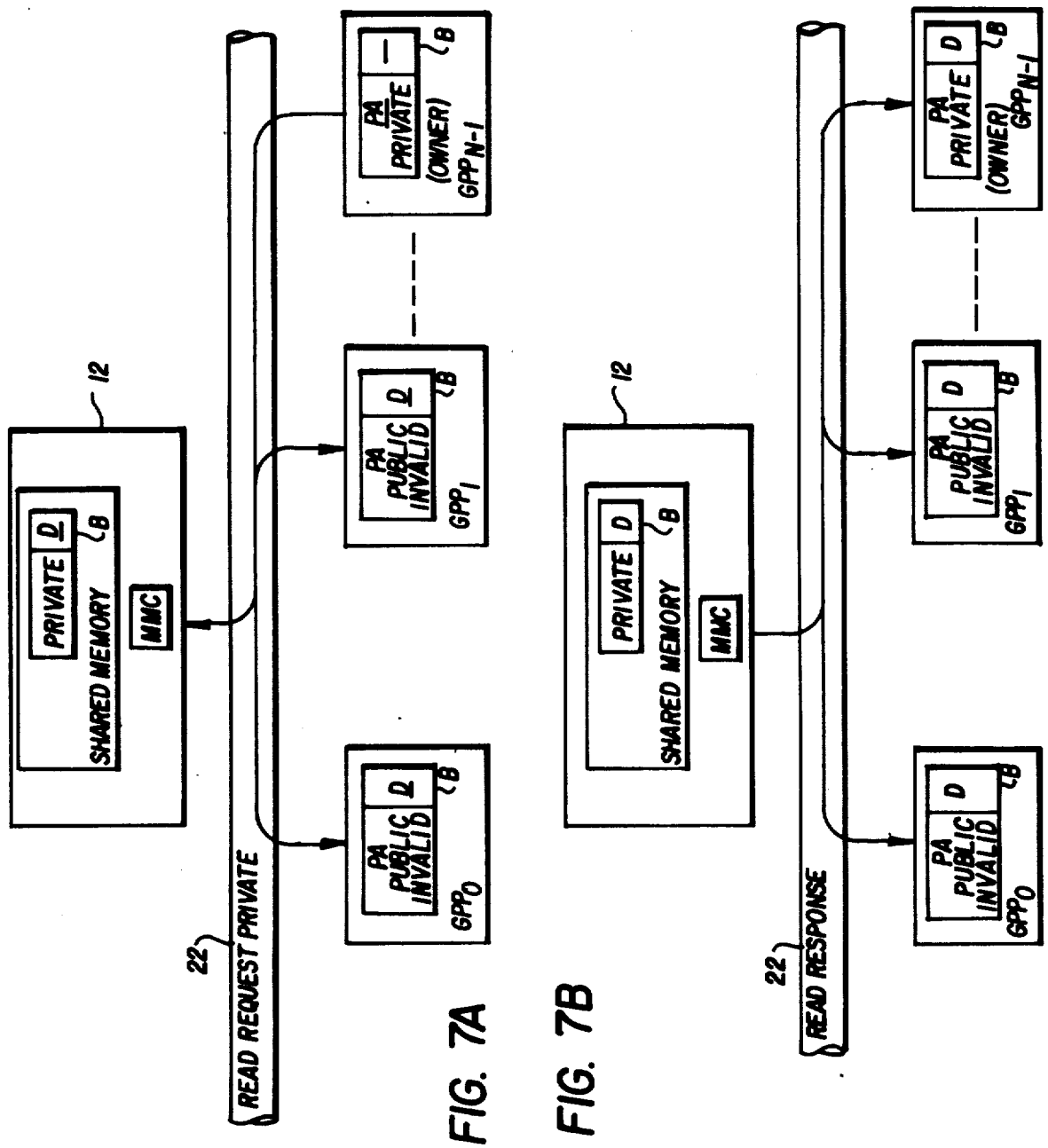
FIG. 7A-FIG. 7B illustrate generally a READ REQUEST PRIVATE bus transaction and READ RESPONSE bus transaction, respectively, of the present invention.

FIG. 7A and FIG. 7B are used to explain overall and generally the bus transaction READ REQUEST PRIVATE and the following bus transaction READ RESPONSE, respectively, assuming that the ownership of address PA and usage mode are as shown in FIG. 6B. Assume that the processor $GPP_{N-1}$ would like to have read/write access to the data D to modify the data D. Consequently, the processor $GPP_{N-1}$, after arbitrating for and receiving access to the bus 22 via the ARB GROUP, produces the INFO GROUP shown in FIG. 4C on the bus 22. Being the OWNER of the address PA, and assuming that the shared memory SM is not busy, the shared memory SM accepts receipt of the INFO GROUP via the ACK signal of SM-ACK of the ACK GROUP. Upon the generation of the ACK, ownership of the address PA is transferred from shared memory SM to the processor $GPP_{N-1}$, with the shared memory SM resetting the usage mode flag U to PRIVATE and processor $GPP_{N-1}$ setting the validity flag V to VALID. The processors $GPP_0$-$GPP_1$, which are monitoring the bus 22 for addresses PA of data D that they have stored in their cache memories $CM_0$-$CM_1$, upon receipt of this ACK, reset the validity flags V to INVALID for the address PA, thereby invalidating the corresponding data D.

Thereafter, as shown in FIG. 7B, the shared memory SM, after accessing the bus 22 via the ARB GROUP, transfers the data D over the bus 22 as part of the INFO GROUP shown in FIG. 4D. Thus, at the completion of this READ RESPONSE, as indicated in FIG. 7B, the processor $GPP_{N-1}$ is the OWNER of the address PA, the usage mode flag U is set for PRIVATE and the data D are available for read/write accesses by the processor $GPP_{N-1}$.

Figures 8A, 8B:
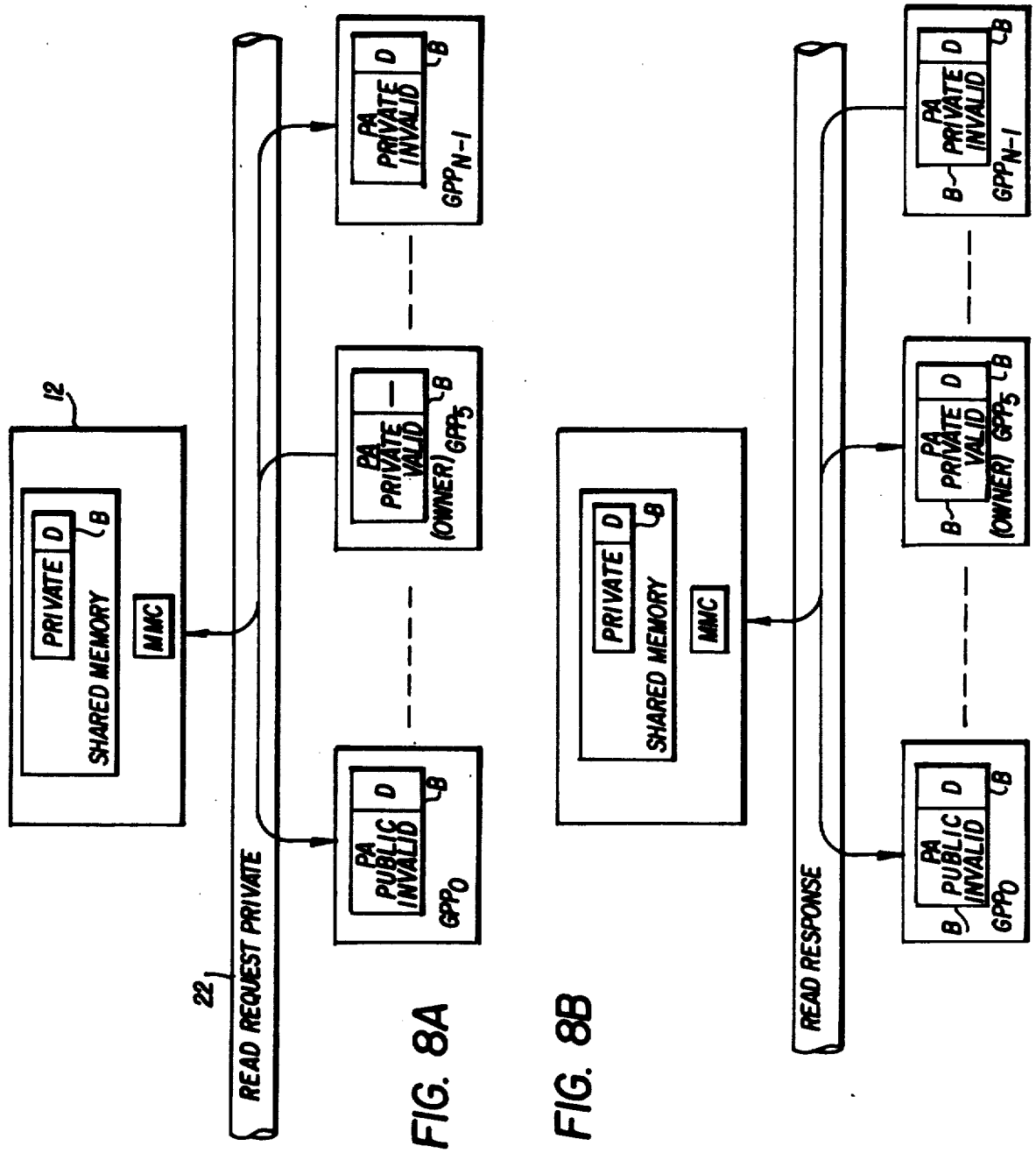
FIG. 8A-FIG. 8B are used to explain further a READ REQUEST PRIVATE bus transaction and READ RESPONSE bus transaction, respectively, of the present invention.

FIG. 8A and FIG. 8B are used to explain overall and generally the bus transaction READ REQUEST PRIVATE and the bus transaction READ RESPONSE when the OWNER of the address PA and the usage mode of the data D are as given in FIG. 7B. That is, assume that processor $GPP_{N-1}$ is the OWNER of the address PA and that the usage mode of the data D is PRIVATE.

Assume now, as indicated in FIG. 8A, that the processor $GPP_5$ desires read/write access to the data D of address PA. Accordingly, requesting processor $GPP_5$, after arbitrating for and receiving access to the bus 22, produces the INFO GROUP shown in FIG. 4C on the bus 22. Being the OWNER of the address PA, the processor $GPP_{N-1}$ acknowledges receipt of the INFO GROUP via the ACK of CM-ACK of the ACK GROUP and resets the validity flag V to INVALID. Also, in accordance with the change in ownership, processor $GPP_5$ sets the validity flag V to VALID.

Thereafter, as shown in FIG. 8B, processor $GPP_{N-1}$ initiates the bus transaction READ RESPONSE, which includes the ARB GROUP and INFO GROUP as shown in FIG. 4D. Thus, processor $GPP_5$ is the new OWNER of the address PA and has read/write access to a VALID copy of the data D.

FIG. 9A-FIG. 9D are used to describe overall and generally the bus transaction READ REQUEST PUBLIC under a condition shown in FIG. 8B in which the OWNER of the address PA is the processor $GPP_5$ and the data D have a usage mode of PRIVATE. Assume that processor $GPP_2$ wants to read the data D. Accordingly, as shown in FIG. 9A, processor $GPP_2$ initiates the bus transaction READ REQUEST PUBLIC. Processor $GPP_5$, being the OWNER of the address PA, then transmits over bus 22 BUSY as the signal CM-ACK of the ACK GROUP, which is then received by processor $GPP_2$.

Next, as shown in FIG. 9B, processor $GPP_5$ initiates the bus transaction WRITE MODIFIED or WRITE UNMODIFIED, depending on whether the data D had been previously modified by the processor $GPP_5$. The result is that shared memory SM receives the appropriate INFO GROUP (see FIG. 4E and FIG. 4F). Then, shared memory SM transmits ACK of SM-ACK of the ACK GROUP over the bus 22, which is received by processor $GPP_5$, with shared memory SM resetting the usage mode flag U to PUBLIC and processor $GPP_5$ resetting the validity flag V to INVALID. At this time, therefore, shared memory SM is the OWNER of the address PA and the usage mode of the data D is PUBLIC. Also, therefore, at this time, the ownership of the address PA and usage mode of the data D, shown in FIG. 9B, are the same as indicated in FIG. 5A.

Next, as shown in FIG. 9C, processor $GPP_2$ issues again the bus transaction READ REQUEST PUBLIC followed by shared memory SM issuing the bus transaction READ RESPONSE as shown in FIG. 9D. This sequence is similar to that described in relation to FIG. 5A and FIG. 5B, respectively. Consequently, the result of the first bus transaction READ REQUEST PUBLIC, shown in FIG. 9A, is that the processor $GPP_2$ has a VALID and PUBLIC copy of the data D and that shared memory SM is the OWNER of the address PA of that data D.

Figure 10:
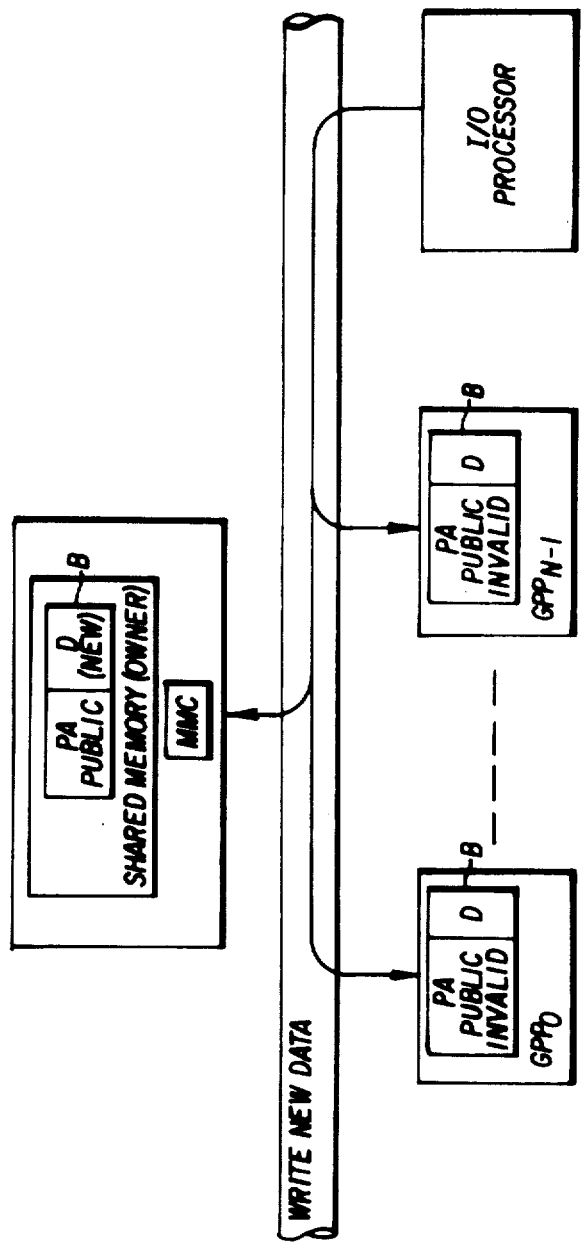
FIG. 10 illustrates generally a WRITE NEW DATA bus transaction of the present invention.

FIG. 10 is used to explain overall and generally the bus transaction WRITE NEW DATA under a condition, for example, in which the shared memory SM is the OWNER of the address PA and a number of processors, e.g., processor $GPP_0$, $GPP_1$ and $GPP_{N-1}$, have a copy of the data D. The bus transaction WRITE NEW DATA is initiated by the I/O processor 26 over the bus 22. In response to the generation of ACK of SM-ACK by the shared memory SM, processor $GPP_0$, processor $GPP_1$, and processor $GPP_{N-1}$ reset the validity flag V to INVALID and shared memory SM resets the usage mode flag U to PUBLIC. Consequently, at this time, shared memory SM is the OWNER of the address PA and stores the new data D.

In summary thus far, each processor $GPP_0$–$GPP_{N-1}$ can initiate certain bus transactions and must monitor the bus 22 for all of the bus transactions. Particularly, each processor $GPP_0$–$GPP_{N-1}$ can initiate (1) READ REQUEST PUBLIC, (2) READ REQUEST PRIVATE, (3) READ RESPONSE, (4) WRITE UNMODIFIED, and (5) WRITE MODIFIED. The remaining bus transaction WRITE NEW DATA is initiated by the I/O processor 26.

Each given processor $GPP_0$–$GPP_{N-1}$ must monitor all the bus transactions for physical addresses PA that are on the bus 22, in the event any one or more of these physical addresses PA are stored in the respective processors $GPP_0$–$GPP_{N-1}$. If these physical addresses PA are so stored, then the given processor $GPP_0$–$GPP_{N-1}$ may ultimately take the following action for stored VALID copies of the corresponding data D.

If the monitored bus transaction is READ REQUEST PUBLIC, and if the stored address PA has a usage mode of PUBLIC, then the given processor $GPP_0$–$GPP_{N-1}$ takes no action. If, however, the stored address has a usage mode of PRIVATE, then the given processor $GPP_0$–$GPP_{N-1}$ (1) produces BUSY for the CM-ACK of ACK GROUP, (2) initiates WRITE MODIFIED or WRITE UNMODIFIED to the shared memory SM, and (3) resets the validity flag V of the corresponding data D to INVALID.

If the monitored bus transaction is READ REQUEST PRIVATE, and if the stored address PA has a usage mode of PUBLIC, then the given processor $GPP_0$–$GPP_{N-1}$ resets the validity flag V to INVALID. If, however, the stored address PA has a usage mode of PRIVATE, then the given processor $GPP_0$–$GPP_{N-1}$ (1) resets the validity flag V to INVALID and (2) then issues the READ RESPONSE. Thus, in this case there is direct processor-to-processor transfer of data.

If the monitored bus transaction is READ RESPONSE, then the given processor $GPP_0$–$GPP_{N-1}$ takes no action.

If the monitored bus transaction is WRITE UNMODIFIED, and whether the usage mode is PUBLIC or PRIVATE, then an error condition has occurred. The same applies if the monitored bus transaction is WRITE MODIFIED.

If the monitored bus transaction is WRITE NEW DATA, and whether the stored address PA has a usage mode of PUBLIC or PRIVATE, then the particular processor $GPP_0$–$GPP_{N-1}$ resets the corresponding validity flag V to INVALID.

Figure 11:
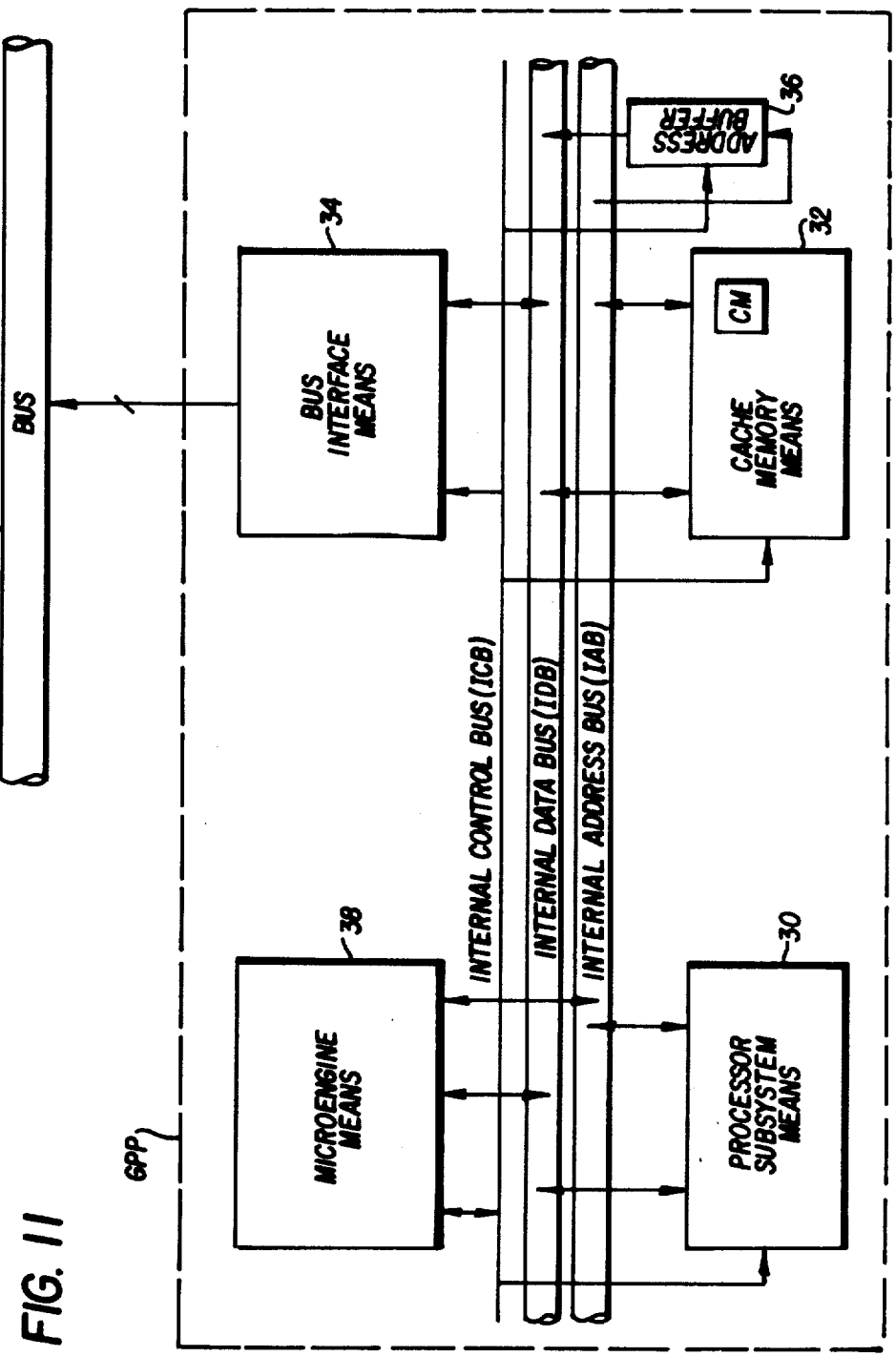
FIG. 11 shows a block diagram of a processor means of the present invention.

FIG. 11 shows a block diagram of an exemplary general purpose processor GPP, i.e., one of the processors $GPP_0$–$GPP_{N-1}$. The general purpose processor GPP has a processor subsystem means 30, an addressable cache memory means 32, having a cache memory CM, a bus interface means 34, and an address buffer 36, all of which are under synchronous control by a microengine means 38, except as described below. Communication among the processor subsystem means 30, the cache memory means 32, the bus interface means 34, the buffer 36 and the microengine means 38 is performed over an internal control bus ICB, an internal address bus IAB and an internal data bus IDB. The bus interface means 34 provides an interface between the internal data bus IDB and the expansion bus 22.

Except as more specifically described below, the general purpose processor GPP operates generally in the following manner. The processor subsystem means 30 will produce a given logical address LA on the internal address bus IAB to access desired data D, which may or may not be stored in the cache memory CM ("cache hit" or "cache miss"). If the desired data D of a physical address PA are stored in the cache memory CM, then a cache hit has occurred, and this information is provided to the microengine means 38 by the cache memory means 32. No further intervention by the microengine means 38 is then required, but rather the cache memory means 32 now controls access to the cache memory CM to supply the requested data D over the internal data bus IDB to the processor subsystem means 30 to complete the data access.

If the desired data D are not stored in the cache memory CM, a cache miss has occurred, and this information is provided to the microengine means 38 by the cache memory means 32. Consequently, the microengine means 38 intervenes to deallocate data D currently stored in the cache memory CM and to acquire the desired data D from shared memory SM; also the access to the cache memory CM by the processor subsystem means 30, i.e., the current memory access cycle, is temporarily halted by the microengine means 38 until the desired data D are stored in the cache memory CM.

More specifically, upon a cache miss, the microengine means 38 controls processor subsystem means 30 to halt the current memory access cycle, accesses current data D stored in the cache memory CM and then controls the bus interface means 34 to initiate, if the current data D are PRIVATE, the bus transaction WRITE MODIFIED or WRITE UNMODIFIED, depending on whether the current data D had been modified or unmodified, thereby completing the deallocation of the current data D. Then, the microengine means 38 controls the bus interface means 34 to initiate a READ REQUEST PRIVATE or READ REQUEST PUBLIC to acquire the desired data D. Under control of the microengine means 38, the bus interface means 34 next monitors a READ RESPONSE which, when received, results in the received desired data D being transferred by the microengine means 38 to the cache memory CM via the internal data bus IDB. Thereafter, the microengine means 38 instructs the processor subsystem means 30 to issue again the logical address LA, i.e., to continue again the current memory access cycle, resulting in a cache hit and access to the desired data D under control by the cache memory means 32.

The bus interface means 34 also performs the monitoring of all bus transactions on the bus 22 for physical addresses PA of all data D that are stored in the cache memory CM. If such an address PA is on the bus 22, the bus interface means 34 accepts the bus transaction via the ACK GROUP and informs the microengine means 38 of this. In response, the microengine means 38 controls the cache memory means 32 and the bus interface means 34 to produce the bus transaction READ RESPONSE on the bus 22.

Figure 12:
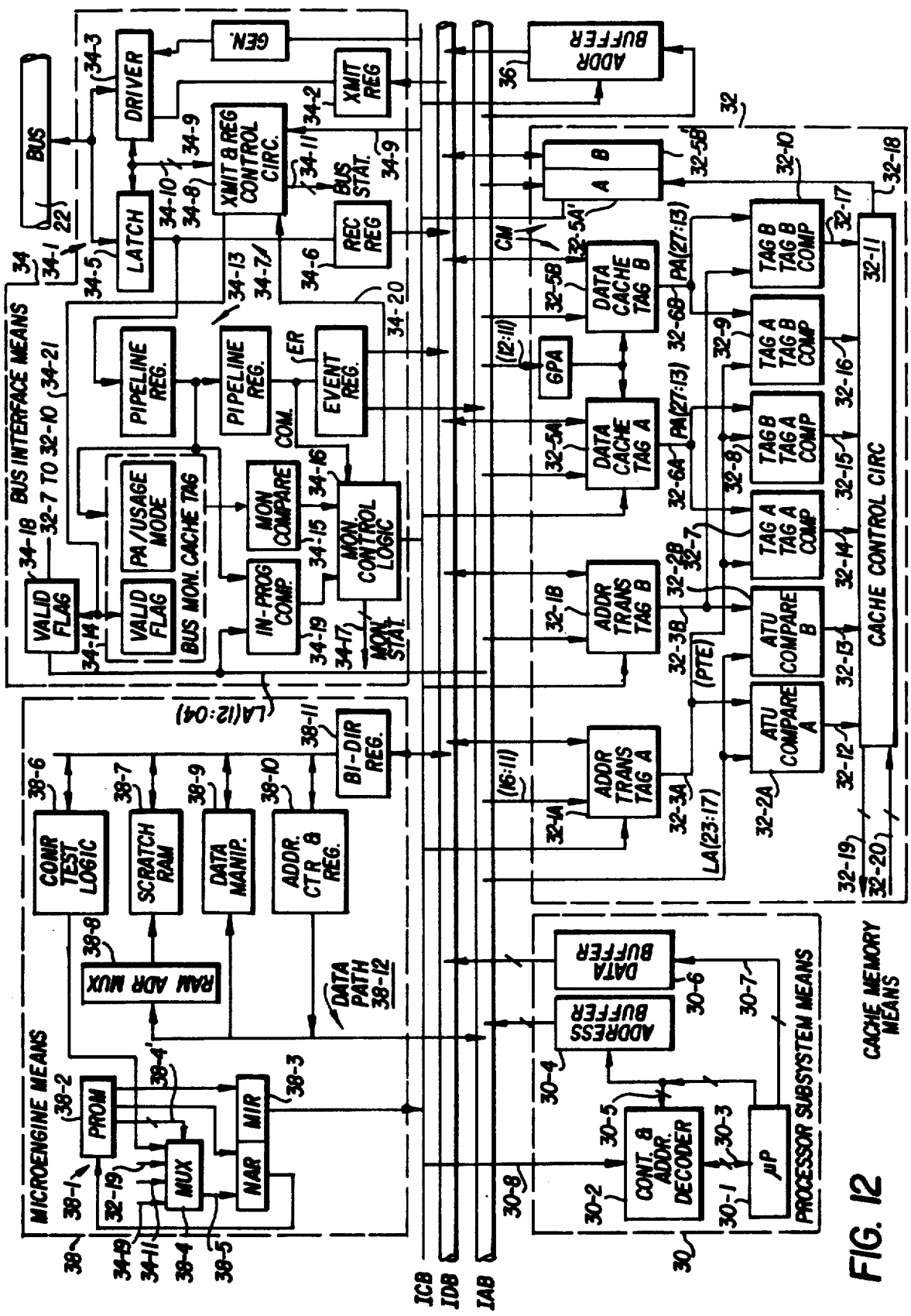
FIG. 12 is a detailed diagram of the processor means of FIG. 11.

FIG. 12 illustrates in more detail the general purpose processor GPP shown in FIG. 11. The processor subsystem means 30 includes a microprocessor 30-1, such as the MC68000 manufactured by the Motorola Corporation, which is coupled to a microprocessor controller and address decoder circuit 30-2 over a path shown generally at 30-3. An address buffer 30-4 couples logical addresses LA received from the circuit 30-2 via an address bus path 30-5 onto the internal address bus IAB. A data buffer 30-6 couples data between the microprocessor 30-1 and the internal data bus IDB via a data bus path 30-7. The circuit 30-2 is under control by the microengine means 38 in response to control signals being received on a line 30-8 coupled to the internal control bus ICB.

In the operation of processor subsystem means 30, to access desired data D for a given memory access cycle, microprocessor 30-1 and circuit 30-2 produce a logical address LA which is then outputted onto the internal address bus IAB via address buffer 30-4. If a cache hit has occurred, as mentioned briefly above, the data D are transferred from the cache memory means 32 to the microprocessor 30-1 via internal data bus IDB and data buffer 30-6 without any waiting by the microprocessor 30-1. If a cache miss has occurred, also as mentioned above briefly, the microengine means 38 controls the circuit 30-2 via the control line 30-8 to halt the current memory access cycle by the microprocessor 30-1 pending the acquisition and storage of the desired data D in the cache memory CM, i.e., the microprocessor 30-1 is placed in a wait state. Thereafter, microengine means 38 controls the circuit 30-2 via the control line 30-8 to again output the logical address LA onto the internal address bus IAB via the address buffer 30-4, whereby the desired data D will be accessed and received by the microprocessor 30-1 via the data buffer 30-6 for processing.

In order to understand more fully the hardware details of the cache memory means 32, the bus interface means 34 and the microengine means 38 to be described below, an overall cache organization and address translation technique of the general purpose processor GPP, as one example used in the present invention, will now be described in detail with reference to FIGS. 13–16. FIG. 13 shows the organization of the cache memory CM, which records physical addresses PA (specifically physical address tags discussed below) of all data D stored in the cache memory CM. To minimize size, the cache memory CM (and shared memory SM) is divided into blocks B of data D, i.e., quadwords QW as previously mentioned, with a block B being the basic unit of transfer between the cache memory CM and shared memory SM. The cache memory size is, for example, 1024 quadwords QW, with each address PA of the cache memory CM corresponding to one quadword QW or block B of data D. Set associative look-up (set size =2, e.g., set A and set B) and hash coding or indexing are used, i.e., two blocks B per hash index. On a cache miss, one quadword QW, i.e., the desired quadword QW, is moved from shared memory SM to the cache memory CM, after a random replacement algorithm, for example, is used to deallocate a stored quadword QW in the cache memory CM to provide a storage location for the desired quadword QW.

Figure 21:
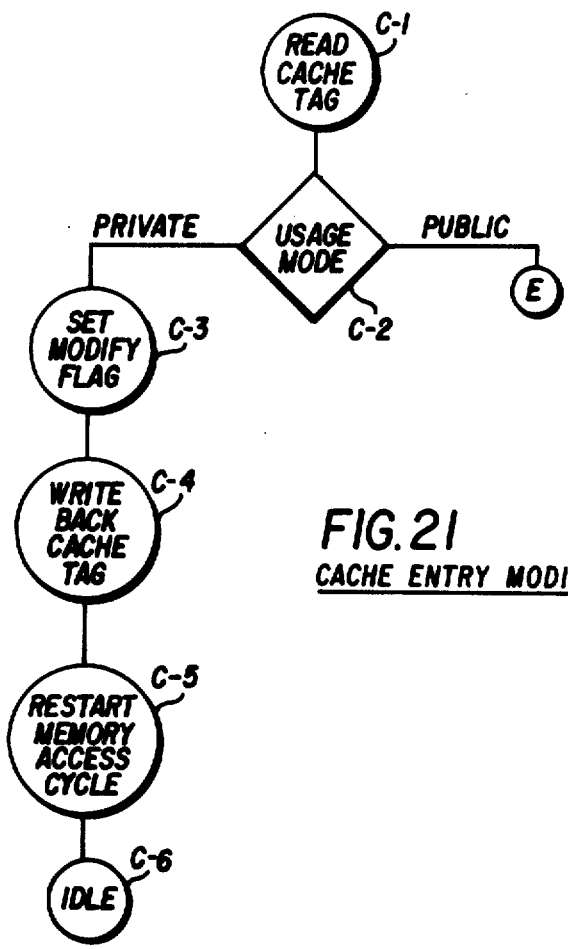
FIG. 19-FIG. 23 are flow charts used to explain the operation of the present invention.

Also, the present invention employs non-write-through. Thus, a quadword QW that is updated or modified by the microprocessor 30-1 while stored in the cache memory CM as discussed below in connection with the Cache Entry Modified routine of FIG. 21, is not immediately written to the shared memory SM (non-write-through). Rather, a write-through will occur when a given modified quadword QW is deallocated (via WRITE MODIFIED) or when another processor GPP requests the modified quadword QW (write through via READ RESPONSE).

FIG. 14 shows in more detail a typical physical address PA, such as a 32-bit physical address PA (31:00), for purposes of explaining the present invention. Specifically, and as just mentioned, a fast search technique is implemented using a combination of hash coding and associative look-up. The hash code field or index of the physical address PA (12:4) shown in FIG. 14 selects one of 512 rows R of the cache memory CM shown in FIG. 13. The physical address PA (31:13) is then compared with the two physical addresses PA (31:13) stored in the selected row R. If there is a match (cache hit), the byte of the quadword field of the physical address PA (3:0) selects the data word (DW$_0$–DW$_3$) of the quadword QW stored in the cache memory CM.

A conventional mapping table is used when, under certain conditions described below, the logical addresses LA produced by processor subsystem means 30 need to be translated to physical addresses PA. For example, and as shown in FIG. 15, a logical address LA is a 24-bit integer (23:00) specifying one byte. The logical address LA has a logical segment number LSN (23:20) specifying one of 16 segments, a logical page number LPN (19:11) specifying one of 512 page table entries PTE within a segment, and a page offset (10:00).

Figure 16:
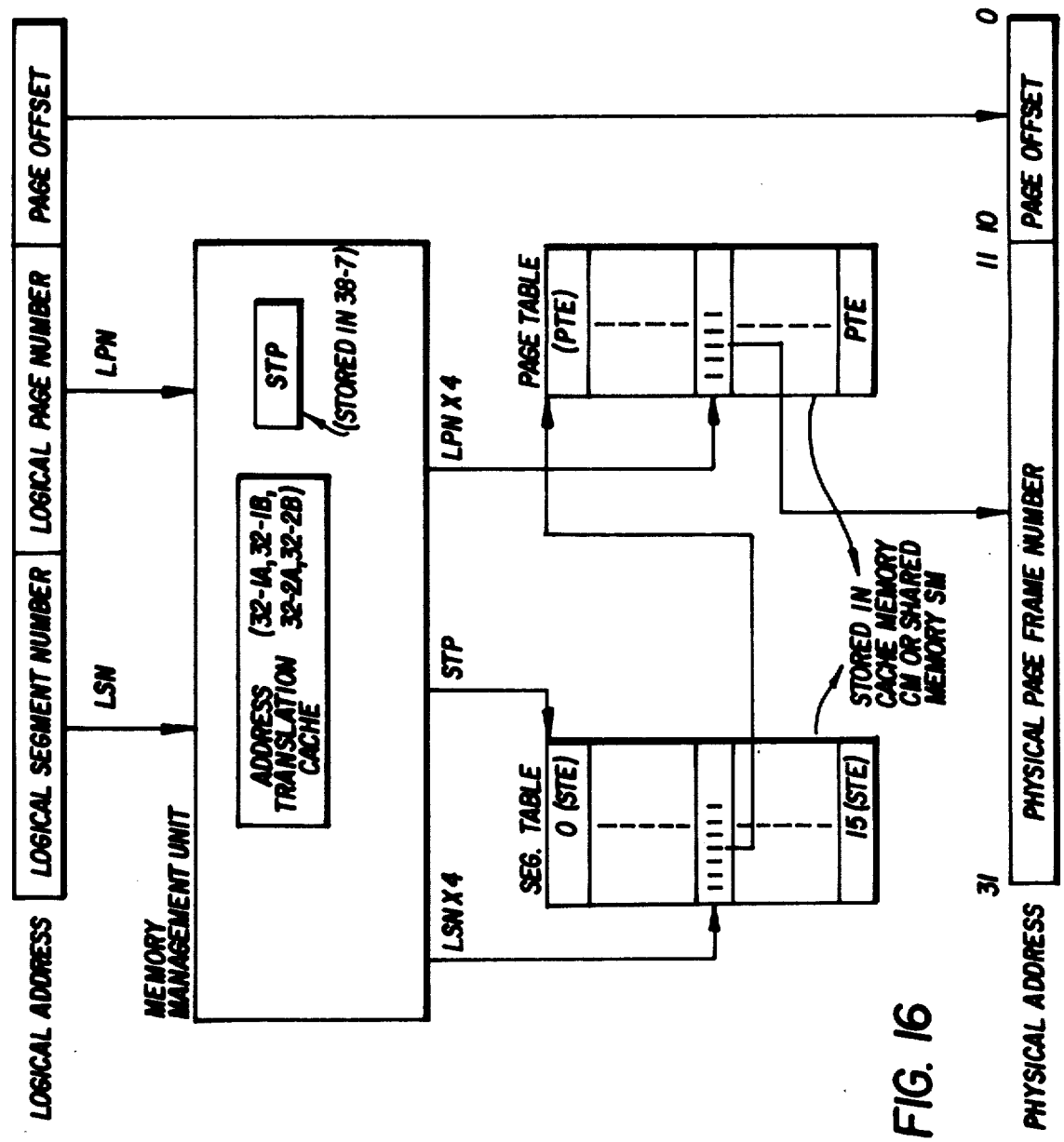
FIG. 16 is used to explain an address translation algorithm.

FIG. 16 is used to explain a logical address-to-physical address algorithm. The logical address-to-physical address translation, when needed, is carried out, as shown in FIG. 16, using a segment table ST having, as one example, sixteen 4-byte segment table entries STE, and using a page table PT having, as one example, 4-byte page table entries (PTE). Each segment table entry STE contains a pointer to a page table entry PTE and the latter contains a pointer to a page in shared memory SM.

Thus, when a logical address LA is produced, the logical segment number LSN (23:20) is multiplied by four, with the result added to the page table pointer extracted from the segment table entry STE. The resultant address points the selected page table entry PTE within the segment's page table PT. Then the specified page table entry PTE is fetched from shared memory SM. The page frame pointer extracted from the page table entry PTE forms bits (31:11) of the physical address PA. The logical page offset (10:00) then directly becomes part (10:00) of the physical address PA. This completes the logical address-to-physical address translation. The logical address-to-physical address translation is used with respect to an address translation cache buffer to be described in connection with cache memory means 32, which stores recently translated physical addresses.

The GPP operation now will be further summarized with reference to a cache hit or a cache miss and the bus transactions previously indicated above. Assume first that there is a cache hit. If the current memory access cycle of the microprocessor 30-1 is a read access to a "read only" type of page of data D, i.e., a page which should not be written, then that data D are read from the cache memory CM and transferred to the microprocessor 30-1 for processing. If the memory access cycle is a read cycle to a "read/write" page, i.e., a page which can be read or written, then the data D are read from the cache memory CM and transferred to the microprocessor 30-1. If the memory access cycle is a write access to a read/write page, then the data D are written to the cache memory CM if the corresponding usage mode is PRIVATE. Also, the modify flag M is set to MODIFIED by the microengine means 38, as will be further described. If the usage mode of such data D is, however, PUBLIC, then this constitutes a cache miss, requiring the microengine means 38 to intervene and acquire or refetch the data D via a READ REQUEST PRIVATE.

Assume now that a cache miss has occurred. If the current memory access cycle is a read access to a read only page, then the microengine means 38 places the processor subsystem means 30 in a halt or wait state and then deallocates a quadword QW currently in the cache memory CM to provide space for the desired quadword QW to be read. The microengine means 38 then causes a READ REQUEST PUBLIC to be issued to the shared memory SM, resulting in the desired quadword QW being stored in the cache memory CM. Then, the microengine means 38 instructs the processor subsystem means 30 to cease waiting, i.e., to output again on the internal address bus IAB the current logical address LA, whereby the desired quadword QW is then read from the cache memory CM and ultimately processed by the microprocessor 30-1.

If the current memory access cycle is a read access cycle to a read/write page, and after halting the processor subsystem meand 30, a current quadword QW is deallocated by the microengine means 38 followed by the microengine means 38 initiating a READ REQUEST PRIVATE to the shared memory SM. After the desired quadword QW is then stored in the cache memory CM, the microengine means 38 instructs the microprocessor subsystem 30 to cease waiting by outputting again the current logical address LA to read this desired quadword QW from the cache memory CM.

Similarly, if the memory access cycle is a write access to a read/write page, then the above-mentioned deallocation of a current quadword QW is performed by the microengine means 38, followed by the issuance of a READ REQUEST PRIVATE. Thereafter, when the desired quadword QW is stored in the cache memory CM, the processor subsystem means 30 is instructed by the microengine means 38 to output again the current logical address LA, with that quadword QW being written and the modify flag M being set to MODIFIED.

The above-mentioned deallocation of a quadword QW that is performed by the microengine means 38 depends on the usage mode of that particular quadword QW. If the usage mode is PUBLIC, then the microengine means 38 merely resets the validity flag V to INVALID without having to transfer that quadword QW to shared memory SM. If, however, the usage mode is PRIVATE, then the microengine means 38 initiates a WRITE MODIFIED or a WRITE UNMODIFIED to transfer that quadword QW to the shared memory SM, depending on whether the modify flag M is set to MODIFIED or reset to UNMODIFIED. The particular quadword QW that is selected by the microengine means 38 to be deallocated can be based on any number of known replacement algorithms by which space is allocated in the cache memory CM to store data being currently accessed.

Figure 17:
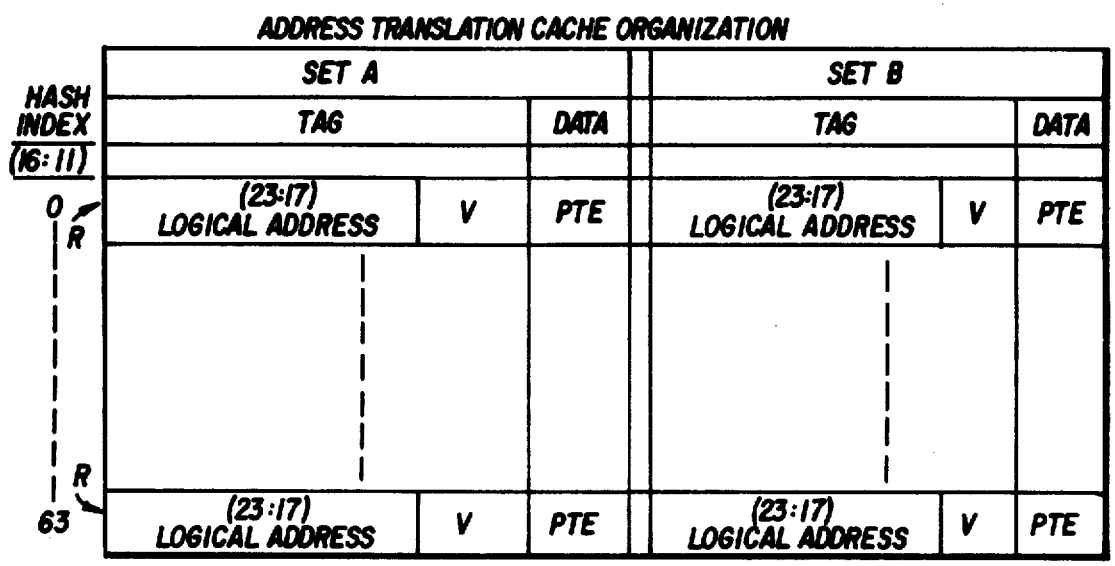
FIG. 17 illustrates the organization of an address translation cache buffer.

In order to minimize access time to the cache memory CM, the cache memory means 32 includes additional hardware components as will now be described. Specifically, the cache memory means 32 includes an address translation tag buffer 32-1A and an address translation tag buffer 32-1B which constitute cache memories storing recently used logical address-to-physical address translations, as briefly mentioned above. The organization of the address translation tag buffers 32-1A and 32-1B is shown in FIG. 17 and correspond to set A and set B, respectively, of the cache memory organization shown in FIG. 13. The overall size of buffer 32-1A and buffer 32-1B is, for example, 128 page table entries PTE with each logical address LA, specifically tag (23:17), corresponding to one page table entry PTE. Set associative look-up (set size = 2, e.g., set A and set B) and hash coding or indexing are used, i.e., there are two page table entries PTE per hash index (i.e., logical address 16:11). The cache memory means 32 also has an address translation unit (ATU) or comparator 32-2A coupled to buffer 32-1A over a path 32-3A, as well as an address translation unit (ATU) or comparator 32-2B coupled to the address translation buffer 32-1B over a path 32-3B.

The cache memory CM of the cache memory control means 32 is shown as including a data cache tag buffer 32-5A and a data cache tag buffer 32-5B which store the tags, including the physical addresses PA (31:11), of set A and set B, respectively, of the cache organization illustrated in FIG. 13. Also shown are memories 32-5A' and 32-5B' which store, respectively, the data D of set A and set B of the cache organization shown in FIG. 13. During a memory access cycle by microprocessor 30-1, each data cache tag buffer 32-5A and 32-5B is read using a guessed physical address (GPA) provided by a logic circuit GPA and logical address LA (10:04), as will be more fully described. The output of each data cache tag buffer 32-5A and 32-5B is then provided on a respective path 32-6A and 36-6B.

The cache memory means 32 also has a comparator 32-7 coupled to paths 32-3A and 32-6A to compare the outputs of buffer 32-1A and buffer 32-5A as shown, a comparator 32-8 coupled to path 32-3B and path 32-6A to compare the outputs of buffer 32-1B and buffer 32-5A as shown, a comparator 32-9 coupled to path 32-3A and path 32-6B to compare the outputs of buffer 32-1A and buffer 32-5B as shown, and a comparator 32-10 coupled to path 32-3B and 32-6B to compare the outputs of buffer 32-1B and buffer 32-5B, as shown.

A cache control circuit 32-11 of the cache memory means 32 responds to or consolidates the results of the comparisons made by comparators 32-2A, 32-2B and 32-7 to 32-10 via respective paths 32-12 to 32-17, provides the sequencing for a cache hit via a line 32-18 and generates a cache status code (such as cache hit or miss) over a path 32-19 for use by the microengine means 38, as will be further described. The cache control circuit 32-11 itself is also controlled by the microengine means 38 via a path 32-20.

In the overall operation of the cache memory control means 32 described above, assume that the microprocessor 30-1 and circuit 30-2 have produced a logical address LA on the internal address bus IAB, which is coupled to cache memory means 32. A fast logical address-to-physical address translation search is then performed by a combination of hash coding and associative look-up in the buffer 32-1A and buffer 32-1B. A hash index field (16:11) of the logical address LA (23:00) selects one of 64 rows R of the buffer 32-1A and buffer 32-1B. The contents of the selected row R of the buffer 32-1A and buffer 32-1B, specifically logical address LA (23:17), are then coupled to comparator 32-2A and comparator 32-2B, respectively. Comparator 32-2A and comparator 32-2B then compare logical address LA (23:17) from buffer 32-1A and buffer 32-1B to the logical address LA (23:17) on the internal address bus IAB. The results of these comparisons are then coupled to cache control circuit 32-11 and indicate an address translation hit or a miss, as will be further described.

In addition, the data cache tag buffer 32-5A and data cache tag buffer 32-5B are addressed using logical address LA (10:4) and a guessed physical address GPA (12:11) produced by logic circuit GPA and described more fully below. Upon being so addressed, the outputs of buffer 32-5A and buffer 32-5B are respective physical addresses PA (27:13) which are coupled as an input to comparators 32-7 to 32-10, as previously indicated. The other input to comparators 32-7 to 32-10 is physical addresses PA (27:13) of the page table entries PTE outputted by buffer 32-1A and buffer 32-1B. The results of the comparisons by comparators 32-7 to 32-10 are coupled to the cache control circuit 32-11 and can be a cache hit or a cache miss.

To understand the generation of the guessed physical address by the logic circuit GPA a brief discussion of a cache hit sequence of cache memory CM now will be made. At the start of a memory access cycle, logical address LA (23:01) is driven onto the internal address bus IAB. Theoretically, the address translation buffer 32-1A or 32-1B then can respond by outputting a physical address PA which is the physical address PA then used to look up the address in the cache memory CM. However, in order to optimize performance, overall the cache memory means 32 performs simultaneously the PTE look-up in the buffers 32-1A and 32-1B and the look-up in the data cache tag buffers 32-5A and 32-5B. As previously indicated, logical address LA (16:11) is available immediately for look-up in the buffers 32-1A and 32-1B, but physical address PA (12:4) is required for look-up in the cache memory CM. By nature of the logical address-to-physical address translation algorithm mentioned above, logical address LA (10:4) is identical to physical address PA (10:4). However, physical address PA (12:11) is not available until after the address translation. Therefore, in order to allow the simultaneous look-up, a guess of the physical address PA (12:11) is made by logic circuit GPA and used for look-up in the data cache tag buffers 32-5A and 32-5B, and is checked against the look-up value in the buffers 32-1A and 32-1B. If the guess matches this latter look-up, then the current memory access cycle may be completed. If the address guess did not match this look-up, the cache control circuit 32-11 adds two extra clock cycles to control the logic circuit GPA to update the guess physical address GPA and repeat the above operation.

A variety of cache status codes is produced by the cache control circuit 32-11 over path 32-19, resulting in the microengine means 38 undertaking certain actions. If comparator 32-2A or comparator 32-2B indicates an address translation hit and one of comparators 32-7 to 32-10 indicates a cache hit, then a status code indicating a cache hit is produced by circuit 32-11 on path 32-19. Microengine means 38 responds by controlling processor subsystem means 30 to allow the current memory access cycle to continue without further intervention, as previously mentioned.

If comparator 32-2A or 32-2B indicates an address translation hit, but comparators 32-7 to 32-10 indicate a cache miss, then a status code indicating a cache miss is produced by circuit 32-11. In response, microengine means 38 causes the processor subsystem means 30 to wait and intervenes further in the following manner. Microengine means 38 commences the cache memory deallocation procedure by reading, i.e., fetching over bus IDB, a row R of one set A or B of information currently stored in the cache memory CM and tests the corresponding usage mode flag U for PUBLIC or PRIVATE. If PUBLIC, then microengine means 38 resets the corresponding validity flag V to INVALID. If PRIVATE, microengine means 38 tests the modify flag M and then initiates a WRITE MODIFIED or WRITE UNMODIFIED, depending on this test, and then resets the validity flag V to INVALID.

Thereafter, microengine means 38 reads, via bus IDB, the physical address PA (31:11) from the buffer 32-1A or 32-1B causing the address translation hit and combines PA (31:11) with the current logical address LA (10:00) to produce a physical address PA (31:00) of the desired quadword QW. The current logical address LA (10:00) is fetched by microengine means 38 via bus IAB, address buffer 36 and bus IDB. Then, microengine means 38 initiates a READ REQUEST PUBLIC or READ REQUEST PRIVATE, using the produced physical address PA as part of the INFO GROUP, followed by appropriately writing the flags V and U.

Thereafter, when the appropriate READ RESPONSE is monitored by bus interface means 34, the received quadword QW is stored in the cache memory CM, i.e., memory 32-5A' or 32-5B', under control by the microengine means 38. Next, microengine means 38 controls processor subsystem means 30 to complete the current memory access cycle to access the newly stored quadword QW.

Assume now that both comparators 32-2A and 32-2B indicate an address translation miss, but that one of the comparators 32-7 to 32-10 indicates a cache hit. Control circuit 32-11 then will produce a cache status code indicating such an address translation miss, resulting in microengine means 38 placing processor subsystem mean 30 in a wait state. Then, and in a similar manner as previously described for deallocating a quadword QW in the cache memory CM, microengine means 38 deallocates an entry in the buffer 32-1A or 32-1B by resetting the corresponding validity flag V (see FIG. 17) for this entry to INVALID. Thereafter, and with reference to FIG. 16, microengine means 38 fetches the current logical address LA via bus IAB, address buffer 36 and bus IDB to calculate an address to a segment table ST. Ultimately, microengine means 38 then stores in buffer 32-1A or 32-1B, i.e., in the row R of such deallocated entry, the logical address LA (23:17) and corresponding page table entry PTE, while setting the corresponding validity flag V of the entry of FIG. 17 to VALID. Thereafter, microengine means 38 removes processor subsystem means 30 from the wait state, resulting in the completion of the current memory access cycle as an address translation and cache hit.

Assume now that comparators 32-2A and 32-2B and comparators 32-7 to 32-10 all indicate a miss. As a result, the operations described above for both misses, i.e., when comparators 32-7 to 32-10 indicate a cache miss and when comparators 32-1A, 32-1B indicate an address translation miss, are performed.

The bus interface means 34 of the general purpose processor GPP has a transmit and recss translation miss, are performed.

The bus interface means 34 of the general purpose processor GPP has a transmit and receive data path shown generally at 34-1 for transferring addresses, commands, data, etc., between the internal data bus IDB and the expansion bus 22. The data path 34-1 includes a transmit register 34-2 and a bus driver 34-3 which are coupled between the internal data bus IDB and the expansion bus 22 over a transmit path shown generally at 34-4 to provide data and addresses on the expansion bus 22. The data path 34-1 also includes a bus receive latch 34-5 and receive register 34-6 which receives data and addresses from the bus 22 and couples this information onto the internal data bus IDB via a receive path shown generally at 34-7.

A transmit and receive control circuit 34-8 is controlled by the microengine means 38 via a path 34-9 coupled to internal control bus ICB to enable either the bus driver 34-3 or the bus receive latch 34-5 over a line 34-10 to transmit or receive information, respectively, as well as to perform other individual functions as will now be described. Control circuit 34-8 arbitrates for the bus 22 via the ARB GROUP; an example of arbitration circuitry that may be used is disclosed in application Ser. No. 454,416, filed Dec. 29, 1982, by Steven J. Frank, et al, entitled Apparatus and Method for Acquiring Access to a Device, which application is assigned to the assignee of the present invention and is incorporated by reference herein in its entirety. In addition, control circuit 34-8, in response to a control signal on line 34-9, generates the command specifying any one of the bus transactions READ REQUEST PUBLIC, READ REQUEST PRIVATE, READ RESPONSE, WRITE MODIFIED and WRITE UNMODIFIED, as well as couples the requestor identification RID from a generator RID onto the bus 22 via driver 34-3 as part of the INFO GROUP. Control circuit 34-8 also produces the CM-ACK of the ACK GROUP, as will be described more fully below. Furthermore, control circuit 34-8 produces a bus status code on a path 34-11, which status code is coupled to the microengine means 38 to indicate when a transfer between internal data bus IDB and bus 22 has been completed. The control circuit 34-8 furthermore compares the RID from generator RID of a given processor GPP with any RID on the bus 22 when a READ RESPONSE is pending to determine if a particular READ RESPONSE is intended for the given processor GPP.

The bus interface means 34 also includes a bus monitor shown generally at 34-12 which implements real time functions for satisfying the expansion bus ownership protocol of the present invention and which operates asynchronously with respect to the microengine means 38. As will be further described, each physical address PA of a quadword QW in data cache tag buffer 32-5A and data cache tag buffer 32-5B of the cache memory means 32 is tracked by the bus monitor 34-12 for validations or invalidations, and for asserting ACK or BUSY of CM-ACK for physical addresses PA of which the processor GPP is the OWNER.

As shown generally at 34-13, the bus monitor 34-12 has a pipelined address path to permit realtime processing of bus transaction commands and physical addresses PA latched in latch 34-5. The bus monitor 34-12 also has a bus monitor data cache tag buffer 34-14 which duplicates the data cache tag buffer 32-5A and data cache buffer 32-5B for both sets A and B of the cache organization shown in FIG. 13. More specifically, the bus monitor data cache tag buffer 34-14 is divided into two memories, one containing the physical addresses PA, i.e., the tags (31:13) and usage mode flags U, and the other storing the validity flags V of the corresponding physical addresses PA. As will be further described, one purpose of this duplication is to enable the processor GPP to monitor physical addresses PA received on the expansion bus 22 so as to respond to appropriate bus transactions if this processor GPP has the quadword QW of the physical address PA being monitored in real time. Another purpose of this duplication is to allow the processor subsystem means 30 to access the cache memory means 32 in parallel with the bus monitoring.

The bus monitor cache tag buffer 34-14 is written under control of the microengine means 38 upon the initiation of a READ REQUEST PUBLIC or READ REQUEST PRIVATE. Once so written, the physical addresses PA stored therein are compared with each physical address PA monitored on the expansion bus 22. The buffer 32-14 is addressed by the monitored physical address PA (12:4) via latch 34-5 and pipeline path 34-13, with the output physical address PA (31:13) being compared with the monitored physical address (23:13) on a per set (A and B) basis in a monitor comparator 34-15. The result of this comparison is forwarded to a monitor control logic circuit 34-16 which provides a bus monitor status code to the microengine means 38 on a path 34-17, as will be further described.

Also shown is a corresponding validity flag memory 34-18 which stores the same validity flags V as buffer 34-14 and which are written in the same manner as the validity flags V of buffer 34-14. The memory 34-18 is read by processor subsystem means 30 at the beginning of a memory access cycle in the following manner and for the following reason. At the beginning of a memory access cycle by processor subsystem means 30, the logical address LA (1the following reason. At the beginning of a memory access cycle by processor subsystem means 30, the logical address LA (12:04) on the internal address bus IAB is used to address memory 34-18, whereby the corresponding validity flag V is coupled to comparators 32-7 to 32-10. If this validity flag V is INVALID, then this is indicated by one of the comparators 32-7 to 32-10, resulting in cache control circuit 32-11 outputting on path 32-19 the status code cache miss. Consequently, this memory access cycle proceeds as a cache miss. If, however, this validity flag V is VALID, then this memory access cycle proceeds as described above.

Also shown is an in-progress comparator 34-19 for comparing logical address LA (23:04) of a current memory access cycle by processor subsystem means 30 with the physical address (23:04) received on the expansion bus 22 and latched in latch 34-5 being processed. As will be further described, this comparison is made as part of the ownership protocol mentioned above. The output of comparator 34-19 is coupled to the monitor control logic circuit 34-16.

If monitor comparator 34-15 indicates a comparison for data D that are PRIVATE, and in-progress comparator 34-19 indicates no comparison, then the monitor control logic circuit 34-16 outputs a control signal on a path 34-20 causing control circuit 34-8 to produce ACK of CM-ACK of an ACK GROUP. As previously mentioned, ownership of an address PA is transferred upon the generation of this ACK, so that control circuit 34-8 also resets the validity flag V to INVALID in buffer 34-14 and memory 34-18 via a line 34-21. As also previously indicated, the processor GPP receiving this ACK will set the corresponding validity flags V in its corresponding bus monitor section 34-12 via its corresponding control circuit 34-8.

The in-progress comparator 34-19 is used for the following reason. As previously described and shown in connection with FIG. 4C, there is a 2-clock or time-slot delay between the time a given processor GPP receives and processes via its bus monitor 34-12 the INFO GROUP of a READ REQUEST (PUBLIC OR PRIVATE) by another processor GPP and the time the given processor GPP generates ACK of CM-ACK of the ACK GROUP, as just described above. During this delay, the processor subsystem means 30 of the given processor GPP may be accessing the data D in its cache memory CM that is requested by the other processor GPP and this is detected by the in-progress comparator 34-19 of the given processor GPP. As a result, the monitor control logic 34-16 of the given processor GPP responds to the output of comparator 34-19 by controlling the control circuit 34-8 via 34-20 to generate BUSY of CM-ACK of the ACK GROUP shown in FIG. 4C.

Also, an event register ER whose output is coupled to the internal data bus IDB is shown as part of the pipleine path 34-13. The event register ER stores or latches the RID received as part of the INFO GROUP of a bus transaction on the bus 22. If the given processor GPP is to respond via a READ RESPONSE to this bus transaction, then the RID latched in register ER is coupled via register ER, internal data bus IDB, and transmit register 34-2, and driven 34-3 onto bus 22 as part of the INFO GROUP of a READ RESPONSE as shown in FIG. 40. The event register ER also stores the monitored physical address PA (12:4) which is fetched by the microengine means 38 over the internal data bus IDB to fetch the corresponding data D from the cache memory 32-5A' or 32-5B'.

The microengine means 38, as shown in FIG. 12, includes a sequencer shown generally at 38-1 constituting a microcode PROM (programmable read only memory) 38-2 and a storage register 38-3. As one example, the PROM 38-2 contains 1,024 microinstructions, each having 72 bits. The storage register 38-3 includes a next address register NAR which stores an address to the next microinstruction to be executed, and a microinstruction register MIR which stores each instruction being executed.

FIG. 18 illustrates a typical microinstruction which is shifted into the microinstruction register MIR. The microinstruction is separated into four fields identified as Microengine Data Path Control, Cache and ATU Tag Control, Data Path Control, and Expansion Bus Control and Monitor. Another field, called Next Address Field, is associated with each microinstruction and provides the next address stored in next address register NAR. Each of these five fields is further subdivided into subfields, as will be described more fully below.

The overall sequencer 38-1 also includes an external status multiplexer 38-4 which receives the cache status code from path 32-19, the expansion bus status code from path 34-11 and the expansion bus monitor status code from path 34-17, and other information as will be further described. The external status multiplexer 38-4 is controlled to couple path 32-19 or path 34-11 or path 34-17 to an output path 38-5 for microinstruction branching purposes, as will be further described.

The Next Address Field, as illustrated in FIG. 18A, and as also will be described in connection with FIG. 12, specifies the next address of the next microinstruction to be executed. The least significant four bits of the next address are acquired by routing these through the multiplexer 38-4 to allow 16-way branches based on the cache status, expansion bus status and expansion bus monitor status codes which are selected by a 2-bit next address multiplexer control signal of the Next Address Field on a line 38-4' (see FIG. 12). The least significant bit of the next address is acquired by routing this bit from a condition test logic 38-6 described more fully below via multiplexer 38-4 to next address register NAR to allow 2-way branching based on the results of a condition test.

The Microengine Data Path Control Field includes a plurality of subfields shown in FIG. 18B. A microengine data path, internal of the microengine means 38 and controlled by the Microengine Data Path Control Field, includes the condition test logic 38-6, a scratch ram 38-7 and ram address multiplexer 38-8, a data manipulation logic 38-9, an address counter/register 38-10 and a bi-directional register 38-11, all of which are coupled together by an internal sequencer data bus shown generally at 38-12. As will be further described, these components perform specialized data and address functions.

The opcode subfield of the Microengine Data Path Control Field controls the data manipulation logic 38-9 and specifies certain operations including (1) set data cache tag usage mode flag U to PUBLIC, (2) set data cache tag usage mode flag U to PRIVATE and the modify flag M to unmodified, (3) set data cache tag usage mode flag U to PRIVATE and the modify flag M to modified, and (4) reset the data cache tag validity flag V to INVALID.

The condition test subfield controls the condition test logic 38-6 to perform certain tests. These tests include (1) test the usage mode flag U of a quadword QW being replaced or deallocated for PRIVATE, (2) test the modify flag M of the quadword QW being replaced for MODIFIED and (3) allocate the usage mode flag U of the new quadword QW for PRIVATE.

The counter control subfield controls the address counter and register 38-10 for providing the address for the address translation tag buffers 32-1A, 32-1B, the address for the data cache tag buffers 32-5A, 32-5B and the physical address PA of a bus transaction which is outputted over the data path 38-11 onto the internal data bus IDB.

The scratch ram control subfield supplies the enabling signals for accessing the scratch ram 38-7. The scratch ram address multiplexer subfield controls multiplexer 38-8 to select the address source for the scratch ram 38-7. The scratch ram 38-7 can be addressed by the processor subsystem means 30 via the internal address bus IAB or the directly from the microinstruction register MIR.

The internal bus register output enable subfield enables the bi-directional register 38-11 to output or input data with respect to the microengine means 38 and internal data bus IDB.

The Cache and Address Translation Unit (ATU) Control Field includes five subfields as shown in FIG. 18C. The cache replacement subfield, which controls the data cache tag buffers 32-5A and 32-5B and the address translation tag buffers 32-1A and 32-1B, (1) selects the replacement of an address from buffer 32-1A or 32-1B and the replacement of a quadword QW from the buffer 32-5A or 32-5B; (2) enables these buffers to place the selected replacement set (A or B) onto the internal data bus IDB; and (3) then transfers the replacement set (A or B) to the condition test logic 38-6 which tests the various flags, as previously indicated.

The data cache tag write subfield enables a write to the selected data cache tag set A or B, i.e., to buffer 32-5A or 32-5B. The ATU tag write subfield enables a write to the selected address translation tag buffer 32-1A, 32-1B (set A or B). This latter subfield is used in conjunction with the ATU tag enable subfield to control the source of data onto the internal address bus IAB.

The ATU tag register control subfield enables loading the current value of the information on the internal data bus IDB into the address translation tag buffer 32-1A, 32-1B (set A and set B).

The Main Data Path Control Field, as indicated in FIG. 18D, has a number of subfields for controlling the data paths associated with the processor subsystem means 30 and the cache memory CM in addition to the interal data bus IDB and the internal address bus IAB. The cache control subfield provides commands to the cache control circuit 32-11 over path 32-20. These commands identify normal operation, which allows access to the cache memory CM to continue running without further intervention from the microengine means 38, i.e., normal operation means a cache hit. When such intervention is required, the cache control circuit 32-11 ceases cache operation. A second command is produced by the microengine means 38 to hold the cache operation when requiring such intervention to service a bus monitor request, or when the operation of the processor subsystem 30 has to be suspended, such as for cache replacement purposes i.e., cache miss. A third command restarts the cache control circuit 32-11 after it has been stopped. A hold subsystem subfieled controls circuit 30-2 of processor subsystem means 30 to hold a current memory access cycle during intervention by microengine means 38.

The cache data path control subfield issues commands to control the data flow between the cache memory CM and the internal data bus IDB.

The cache RAM control subfield controls the enabling and strobing of the cache memory CM to read or write the cache memory CM.

The address generation subfield issues a command to control a source of an address for the internal data bus IDB when that address, as previously described, is to be driven onto the internal data bus IDB, such as when address buffer 36 couples a logical address LA on internal address bus IAB onto internal data bus IDB. The logical address bus source subfield controls two logical address sources for the internal address bus IAB. These are the processor subsystem logical address LA via buffer 30-4 and the microengine data path logical address LA via address counter and register 30-10.

The Expansion Bus Control Field is shown in FIG. 18E and also includes a number of subfields. The expansion bus command subfield issues a command to the transmit and receive control circuit 34-8 to provide the command for the particular bus transaction to be performed. The expansion bus arbitration and transmit control subfield issues commands to the control circuit 34-8 to control arbitration for and hold the bus 22 for a number of clock periods, depending on the particular bus transaction being performed.

The ID enable subfield enables the generator RID to control whether the RID will be driven onto the bus 22. The RID is provided in response to the monitor status control subfield.

The monitor tag update command subfield issues commands to the control circuit 34-8 to write new bus monitor tags and to force the bus monitor busy.

The monitor status command subfield issues commands to the monitor control circuit 34-16 which provides the bus monitor status code to the multiplexer 38-4, as well as provides output enables for a monitor address register (not shown) and output enables for a monitor RID register (not shown).

A more detailed discussion of the operation of the general purpose processor GPP from the perspective of the microengine means 38 and use of the microinstructions will now be described.

Figure 19:
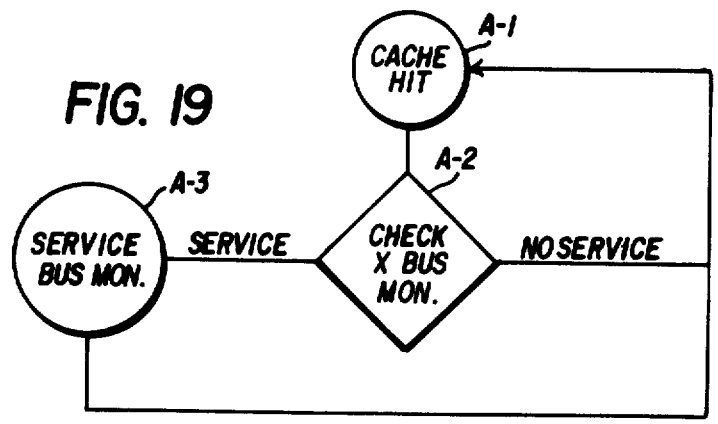

FIG. 19 is a flow chart showing the general algorithm used by the general purpose processor GPP for a cache hit. A more detailed description of the operation of the general purpose processor GPP for a cache hit will follow the discussion of FIG. 19.

Consequently, assume that a cache hit has occurred (block A-1). While this cache hit is being processed, the microengine means 38 checks the monitor control circuit 34-16 (block A-2) to determine if monitor service is required. If no monitor service is required, the subroutine returns (block A-1).

If bus monitor service (block A-2) is required, then the bus monitor service is performed (block A-3).

More specifically, as previously mentioned, upon a cache hit, the cache control circuit 32-11 controls the operation of the cache memory CM without intervention by the microengine means 38. The microengine means 38 decodes the cache hit status via the path 32-19 and checks for bus monitor queue events in parallel with the ongoing cache hit memory access.

Thus, assume that the memory access cycle of the processor subsystem means 30 commences at a time slot $t_1$. During the next time slot $t_2$, the cache control circuit 32-11 indicates a cache hit on the path 32-19, which is reflected in the Next Address Field of the microinstruction during time slot $t_3$ and in the next address during time slot $t_4$.

During time slot $t_4$, the microengine means 38 checks the monitor control circuit 34-16 for pending bus transactions on the expansion bus 22. If no such bus transactions are pending, and the current memory access cycle is a normal read or write access, then the sequencer 38-1 takes a 16-way jump through an idle loop (not shown). If another memory access cycle by the processor subsystem means 30 takes place with a cache hit, then this will be processed once again, in the manner described above. The pipelining of the physical addresses PA on the expansion bus 22 by the pipeline path 34-13 allows the microengine means 38 to check the monitor control circuit 34-16 during the nth memory access cycle by processor subsystem means 30, which nth cycle access will then occur during the n+1th cycle.

If during such a memory access cycle bus monitor service is required, then control passes to the microengine means 38 to perform the monitor servicing.

Figure 20:
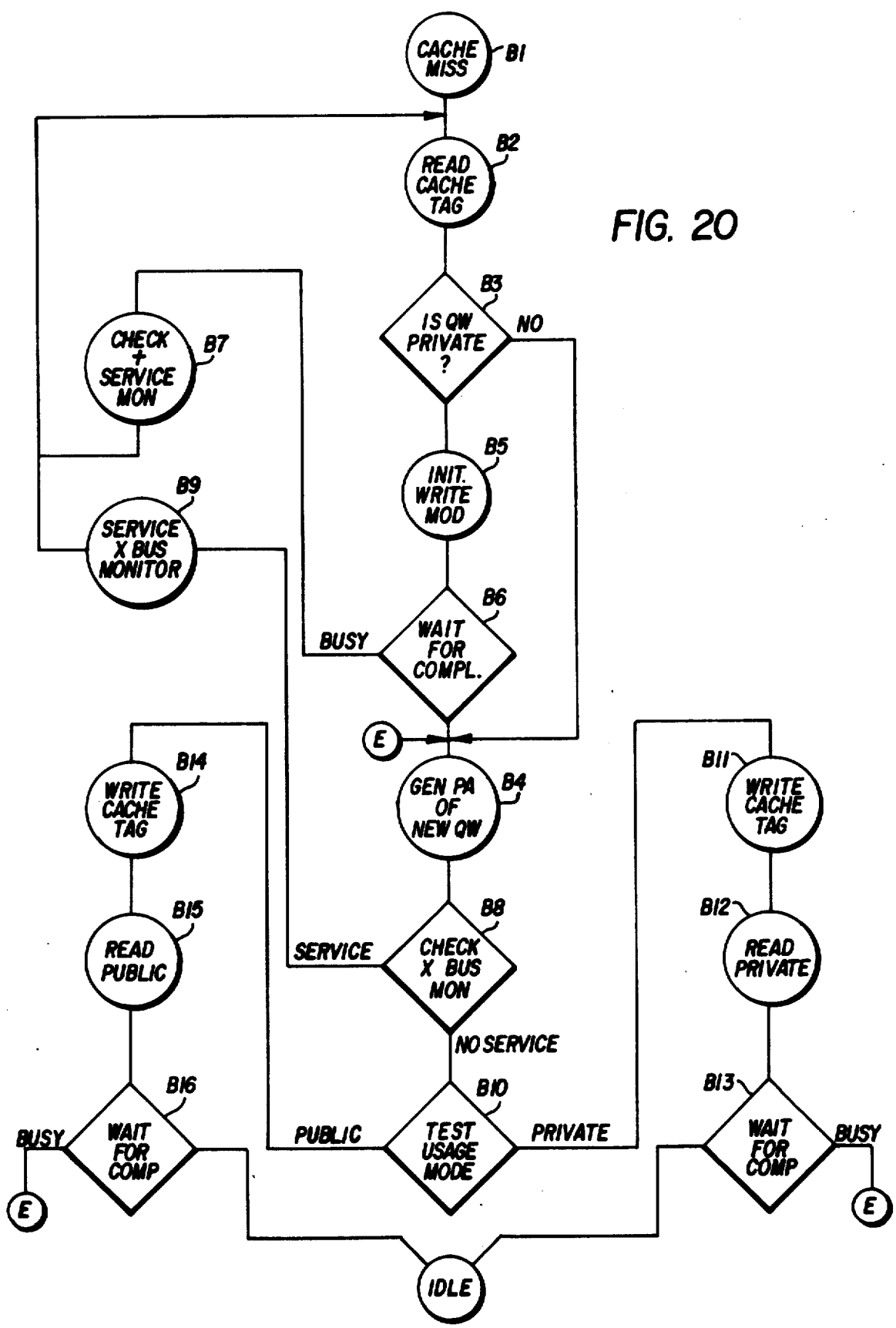

FIG. 20 is a flow chart showing the general algorithm of the general purpose processor GPP for a cache miss (block B-1). A more detailed discussion of the operation of the general purpose processor GPP for a cache miss will follow the discussion of FIG. 20. In response to a cache miss, the microengine means 38 reads the cache tag to be replaced (block B-2) and if the quadword QW to be purged or deallocated is not PRIVATE (block B-3), then the microengine means 38 produces a physical address PA of the new quadword QW to be loaded into the cache memory CM (block B-4).

If, however, the quadword QW to be purged is PRIVATE (block B-3), then the microengine means 38 initiates a WRITE MODIFIED (or UNMODIFIED) bus transaction (block B-5), and then waits for completion of this bus transaction (block B-6). Upon normal completion, the microengine means 38 then produces a physical address PA for the new quadword QW to be fetched (block B-4).

If upon waiting for a completion there is a BUSY signal via an ACK GROUP (block B-6), then the microengine means 38 checks and services the expansion bus monitor (block B-7), followed by a return to cache tag read (block B-2).

After generating the physical address PA for the new quadword QW (block B-4) the microengine means 38 again checks and services the expansion bus monitor (block B-8). If such service is required, then the expansion bus monitor services are processed (block B-9) and the subroutine returns to read cache tag (block B-2). If, however, no such service is required, then the usage mode of the new quadword QW is tested by the microengine means 38 (block B-10). If such usage mode is PRIVATE, then the cache tag is written (block B-11) and then a READ REQUEST PRIVATE is initiated (block (B-12). The microengine means 38 then waits for completion (block B-13), but if BUSY occurs then the subroutine enters at entry point E (block B-4). Upon completion (block B-13), the microengine means 38 returns to an idle state.

If the usage mode of the new quadword QW is PUBLIC (block B-10), the cache tag is written (block B-14) and then a READ REQUEST PUBLIC in initiated (block B-15), followed by a wait for completion (block B-16). If a BUSY occurs, the subroutine re-enters at entry point E (block B-4) or, upon completion, the microengine means 38 returns to an idle state.

More specifically, the cache miss is decoded by the sequencer 38-1 at a particular address during a memory access cycle by the processor subsystem means 30. Therefore, control passes to the subroutine in the sequencer 38-1 starting at a particular address of the micro-instructions stored in PROM 38-2. The current memory access by processor subsystem means 30 is placed in a wait state until a new cache entry is allocated for the physical address PA of the current memory access. At the end of the cache miss routine, the memory access cycle continues. During the cache miss routine, the current logical address LA (10:00) is concatenated by the data manipulation logic 38-9 with the physical address PA (31:11) which is to be replaced to produce physical address PA (31:00). A test is then made by the condition test logic 38-6 to determine whether the particular quadword QW stored in cache memory CM of this physical address PA must be flushed back to shared memory SM. If this quadword QW is PRIVATE and VALID, it must be flushed and execution continues at another address of the microinstructions stored in PROM 38-2 to accomplish this; otherwise, this quadword QW is INVALID or PUBLIC, in which case the flush can be skipped with execution continuing to acquire the new or desired quadword QW.

Prior to initiating a READ REQUEST (PUBLIC or PRIVATE to acquire the new or desired quadword QW), the microengine means 38 must service any requests initiated by the bus monitor control circuit 34-16 and additional requests must be inhibited to prevent a deadlock condition. The additional requests are inhibited by forcing the generation of BUSY of CM-ACK which causes any READ REQUEST for a PRIVATE quadword QW in the cache memory CM to be busied instead of acknowledged. All requests for that quadword QW are busied until the desired quadword QW is acquired. Also, the bus monitor 34-12 is checked and serviced by a 16-way jump of the microinstructions based on the bus monitor status identified on path 34-14. If an event must be serviced, the cache miss routine is re-entered at entry point E when this service is completed.

The current bus transaction by the GPP, i.e., the READ REQUEST (PUBLIC or PRIVATE) to acquire the desired quadword QW, then starts at a given address of the microinstructions. The physical address PA of the desired quadword QW is then outputted onto the internal address bus IAB. A test is then made to determine whether the desired quadword QW has a usage mode of PUBLIC or PRIVATE. Control then passes to a subroutine of the microinstructions based on this test to write the new quadword QW into cache memory CM as PRIVATE or PUBLIC.

Thereafter, the current memory access by the microprocesser subsystem means 30 is continued and the appropriate data paths are set up by the microengine means 38 for this memory access cycle. The cache control circuit 32-11 is then restarted and control is passed to the idle loop of the microengine means 38. The current memory access is then completed as a cache hit.

FIG. 21 illustrates a flow chart of a subroutine entitled Cache Entry Modified, which is used to modify a quadword QW. First, the cache tag buffer 32-5A or 32-5B is read (block C-1) and the usage mode flag U of the corresponding quadword QW is determined (block C-2) by the condition test logic 38-6. If the quadword QW is PUBLIC, then the subroutine enters at entry point E (see FIG. 20). If, however, the usage mode is PRIVATE, the modify flag M is set (block C-3) in the data manipulation logic 38-9, followed by a cache tag buffer write back (block C-4). Then, the current memory access cycle is completed (block C-5), by which processor subsystem means 30 can receive and modify the quadword QW. Thereafter, the microengine means 38 returns to idle (block C-6).

In particular, the Cache Entry Modified subroutine indicates two conditions on cache writes by microprocessor 30-1. First, a write is being attempted to a PUBLIC quadword QW or, second, a write is being attempted to a PRIVATE quadword QW with its modify flag M reset. The first case is handled by refetching the quadword QW as PRIVATE via a READ REQUEST PRIVATE and then allowing the write memory access cycle by processor subsystem means 30 to proceed. The second case is handled by setting the modify flag M.

Specifically, Cache Entry Modified is decoded at an address of the microinstructions of sequencer 38-1. A cache tag of buffer 32-5A or 32-5B corresponding to the accessed quadword QW is enabled onto the internal data bus IDB and then latched into the register 38-11. The cache tag is then tested by condition test logic 38-6 for PUBLIC or PRIVATE with a resulting branch following based on that test.

If the quadword QW is PUBLIC, then control passes to the cache miss subroutine to refetch the quadword QW as PRIVATE. At the end of the cache miss subroutine, the memory access cycle will complete with a cache hit.

If the quadword OW is PRIVATE, then the modify flag M is set and rewritten into the cache tag. The cache control circuit 32-11 is then restarted, with the microengine means 38 returning to its idle loop. Thereafter, the memory access cycle will complete with a cache hit.

Figure 22:
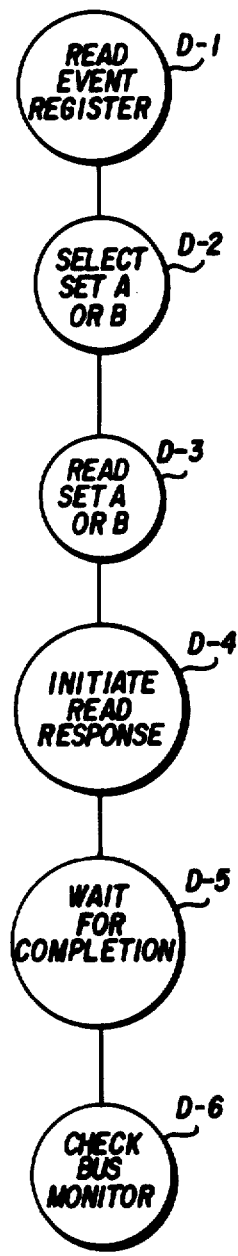

FIG. 22 is a flow chart of a subroutine entitled READ RESPONSE to PRIVATE REQUEST, which is used to explain a READ RESPONSE in connection with data D stored in cache memory CM as VALID and with a usage mode of PRIVATE. After receiving a status code from monitor control logic 34-16 via path 34-17, microengine means 38 reads the event register ER (block D-1), particularly physical address PA (12:04) stored in register ER. Then, using known set associative techniques, microengine means 38 selects set A or set B shown in FIG. 13 (block D-2), and then reads the selected set A or set B of cache memory CM using physical address PA (12:04) (block D-3). Thereafter, microengine means 38 initiates the READ RESPONSE (block D-4), waits for completion (block D-5) and again checks the status of bus monitor 34-12 (block D-6).

More specifically, after monitor control logic 34-16 decodes the bus transaction command READ REQUEST PRIVATE received from the pipeline path 34-13 and receives information from buffer 34-14 indicating the data D are VALID and PRIVATE, a status code is produced on path 34-17 informing microengine means 38 to initiate the READ RESPONSE. Microengine means 38, particularly sequencer 38-1, then branches to a subroutine, whereby event register ER is enabled to output physical address PA (12:04) onto internal address bus IAB and then address buffer 36 is enabled to couple physical address PA from bus IAB onto internal data bus IDB. The microengine means 38 then receives, via bus IDB, the physical address PA (12:04) and uses this address as the hash index to access the cache memory CM (data cache tag set A or set B). As a result, the addressed data cache tag set A or B is enabled onto internal data bus IDB and latched in register 38-11. The corresponding validity flag V is reset to INVALID by data manipulation logic 38-9, loaded into register 38-11 and then written into the corresponding cache tag set A or B. Then, microengine means 38 initiates the command READ RESPONSE and waits for completion via an expansion bus status code from control circuit 34-8 via path 34-11.

Figure 23:
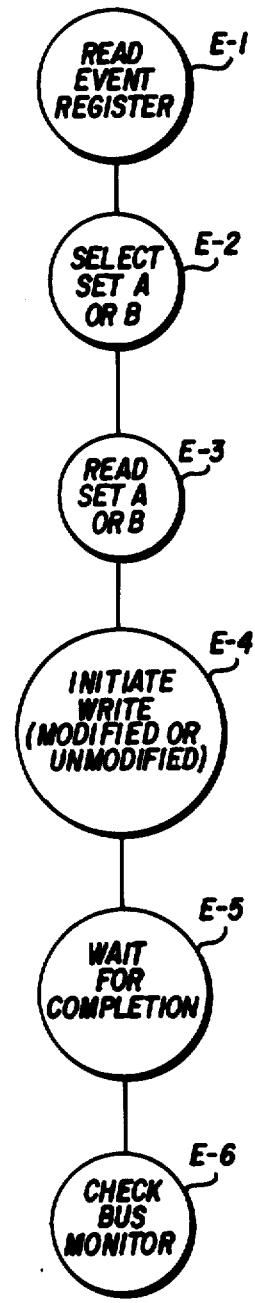

FIG. 23 is a flow chart of a subroutine entitled FLUSH CACHE ENTRY, which is used to explain the response to a READ REQUEST PUBLIC in connection with data D stored in cache memory CM as VALID and with a usage mode of PRIVATE, as briefly described in connection with FIGS. 9A-9B. After receiving a status code from monitor control logic 34-16 via path 34-17, microengine means 38 reads the event register ER (block E-1), particularly physical address PA (12:04) stored in register ER. Then, using known set associative techniques, microengine means 38 selects set A or set B shown in FIG. 13 (block E-2), and then reads the selected set A or set B of the cache memory CM using physical address PA (12:04) (block E-3). Then, microengine means 38 initiates a WRITE MODIFIED or WRITE UNMODIFIED (block E-4), depending on whether the data D had been modified, which includes combining physical address PA (31:13) read from the cache memory CM and physical address PA (12:04) to form physical address PA (31:04) as part of the INFO GROUP of the WRITE (MODIFIED or UNMODIFIED). Then, microengine means 38 waits for completion (block E-5) and again checks the status of bus monitor 34-12 (block E-6). The details of this subroutine of FIG. 23 are similar to those described in connection with the details of FIG. 22.

Figure 24:
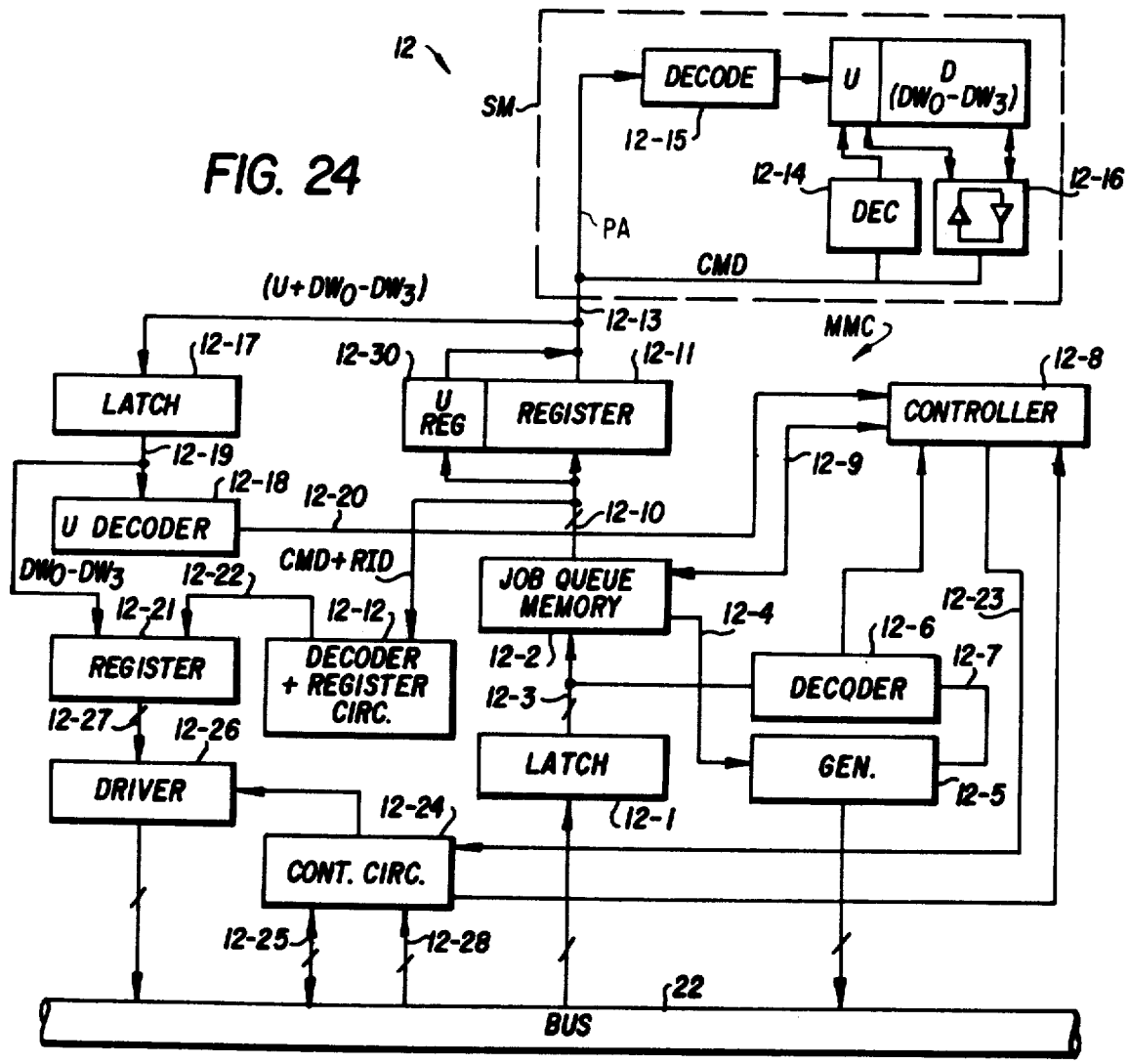
FIG. 24 illustrates a detailed diagram of an addressable main memory means of the present invention.

FIG. 24 illustrates in more detail the main memory controller MMC and shared memory SM of the addressable main memory means 12. As already indicated, the means 12 takes certain actions in relation to a given bus transaction on the bus 22 and these are summarized in the following manner. If a READ REQUEST PRIVATE is on the bus 22, means 12 produces the bus transaction READ RESPONSE if the particular requested data D are PUBLIC and sets the usage mode flag U to PRIVATE. If a READ REQUEST PUBLIC is on the bus 22, means 12 produces the bus transaction READ RESPONSE if the particular requested data D are PUBLIC, but maintains the usage mode flag U reset to PUBLIC. If the bus transaction on the bus 22 is WRITE MODIFIED or WRITE NEW DATA, means 22 writes the modified or new data D and resets the usage mode flag U to PUBLIC. If the bus transaction is WRITE UNMODIFIED, the particular data D are unchanged, but the usage mode flag U is reset to PUBLIC.

In connection with a READ REQUEST (PUBLIC or PRIVATE), the main memory controller MMC includes an input latch 12-1 which latches the INFO GROUP and then outputs this INFO GROUP to a job queue memory 12-2 over a path 12-3. If the job queue memory 12-2 is full and can accept no more information, then an output signal is provided over a line 12-4 to an ACK GROUP generator 12-5 which then produces BUSY as SM-ACK of the ACK GROUP. A hash table address decoder 12-6 decodes the physical address PA of the INFO GROUP on path 12-3, and if such an address PA is within the address space of shared memory SM, then an output signal is produced on a line 12-7 to cause ACK GROUP generator 12-5 to provide ACK as SM-ACK of the ACK GROUP. Thus, if the job queue memory 12-2 is not full, and the physical address PA is within the proper range as decoded by decoder 12-6, then ACK of SM-ACK of the ACK GROUP is produced on the bus 22.

A microcontroller 12-8 is in communication with the job queue memory 12-2 via a line 12-9 to control the inputting of the information on line 12-3 and the outputting of the information on a path 12-10 with respect to memory 12-2. Thus, eventually the command and physical address PA of the INFO GROUP of the particular READ REQUEST (PUBLIC or PRIVATE) is outputted on path 12-10, and then temporarily stored in a register 12-11. Also, the command and RID of the INFO GROUP on path 12-10 are coupled to a command decoder and RID register circuit 12-12 which provides part of the INFO GROUP of the READ RESPONSE by the means 12, as will be further described.

The command and physical address PA stored in register 12-11 are coupled via a bidirectional path 12-13 to a command decoder 12-14 and address decoder 12-15 of shared memory SM. The address decoder 12-15 decodes the physical address PA to access the addressed data D, which are then provided via an input/output circuit 12-16 onto path 12-13 over four time slots for data words $DW_0$–$DW_3$. For a command identifying a READ REQUEST PUBLIC, the usage mode flag U, which is assumed to be PUBLIC, is outputted also onto path 12-13 via circuit 12-16 with data word $DW_0$. For a command identifying a READ REQUEST PRIVATE, the usage mode flag U, which again is assumed to be PUBLIC, is outputted onto path 12-13 with data word $DW_0$, but thereafter a read-modify-write is performed on the stored usage mode flag U whereby it is changed to PRIVATE.

A latch 12-17 then temporarily stores the usage mode flag U and data $DW_0$–$DW_3$ on path 12-13 over the four respective time slots. A 1-bit decoder 12-18 then receives via path 12-19 and decodes the usage mode flag U with the result being outputted on a line 12-20 to microcontroller 12-8. An output register 12-21 then temporarily stores each data word $DW_0$–$DW_3$ over the four time slots via path 12-19, together with the RID from circuit 12-12 via a path 12-22 and the command identifying READ RESPONSE resulting from the decoding of the command READ REQUEST (PUBLIC or PRIVATE) by circuit 12-12. Thus, the output register 12-21 stores the INFO GROUP of the READ RESPONSE shown in FIG. 4D over the four time slots.

In the example given above, the usage mode flag U stored in latch 12-17 is PUBLIC. Therefore, the output signal on line 12-20 from decoder 12-18 results in microcontroller 12-8 producing an output enable signal on a line 12-23 that enables a bus arbitration and transmit control circuit 12-24. In response, circuit 12-24 arbitrates for and ultimately receives access to the bus 22 via a path 12-25 pursuant to the ARB GROUP of the READ RESPONSE, and then activates a driver 12-26 coupled to output register 12-21 via a path 12-27, resulting in the INFO GROUP of the READ RESPONSE being provided on bus 22. Thereafter, the ACK GROUP of the READ RESPONSE is received over a path 12-28 by circuit 12-24 and coupled by the latter to microcontroller 12-8 via a line 12-29 to indicate if the data $DW_0$–$DW_3$ were properly received by a requesting processor GPP producing the READ REQUEST (PUBLIC or PRIVATE). Circuit 12-24 has similar arbitration and transmit circuitry described previously as each processor GPP.

If, however, the usage mode flag U stored in latch 12-17 is PRIVATE, the output signal on line 12-20 from decoder 12-18 results in microcontroller 12-8 not enabling circuit 12-24.

Now assume that a WRITE MODIFIED or WRITE NEW DATA is received by means 12. The corresponding INFO GROUP will be stored in and outputted from the job queue memory 12-2, and the ACK GROUP will be produced by ACK generator 12-5, as previously described in connection with a READ REQUEST (PUBLIC or PRIVATE). As shown in FIG. 24, register 12-11 also has a 1-bit tag or usage mode register 12-30, so that when the command of this INFO GROUP is outputted on line 12-10, register 12-30 responds by resetting the bit to PUBLIC. Thereafter, the command, physical address PA, and usage mode bit PUBLIC are outputted onto path 12-13, whereby decoder 12-15 decodes the physical address PA and decoder 12-14 decodes the command so that the data D of the INFO GROUP are stored in shared memory SM at the addressed location together with the usage mode flag U of PUBLIC. A similar operation occurs in connection with the bus transaction WRITE UNMODIFIED, except that only the usage mode flag U is written from register 12-30 into shared memory SM at the addressed location of the physical address PA without writing any data D.

Figure 25:
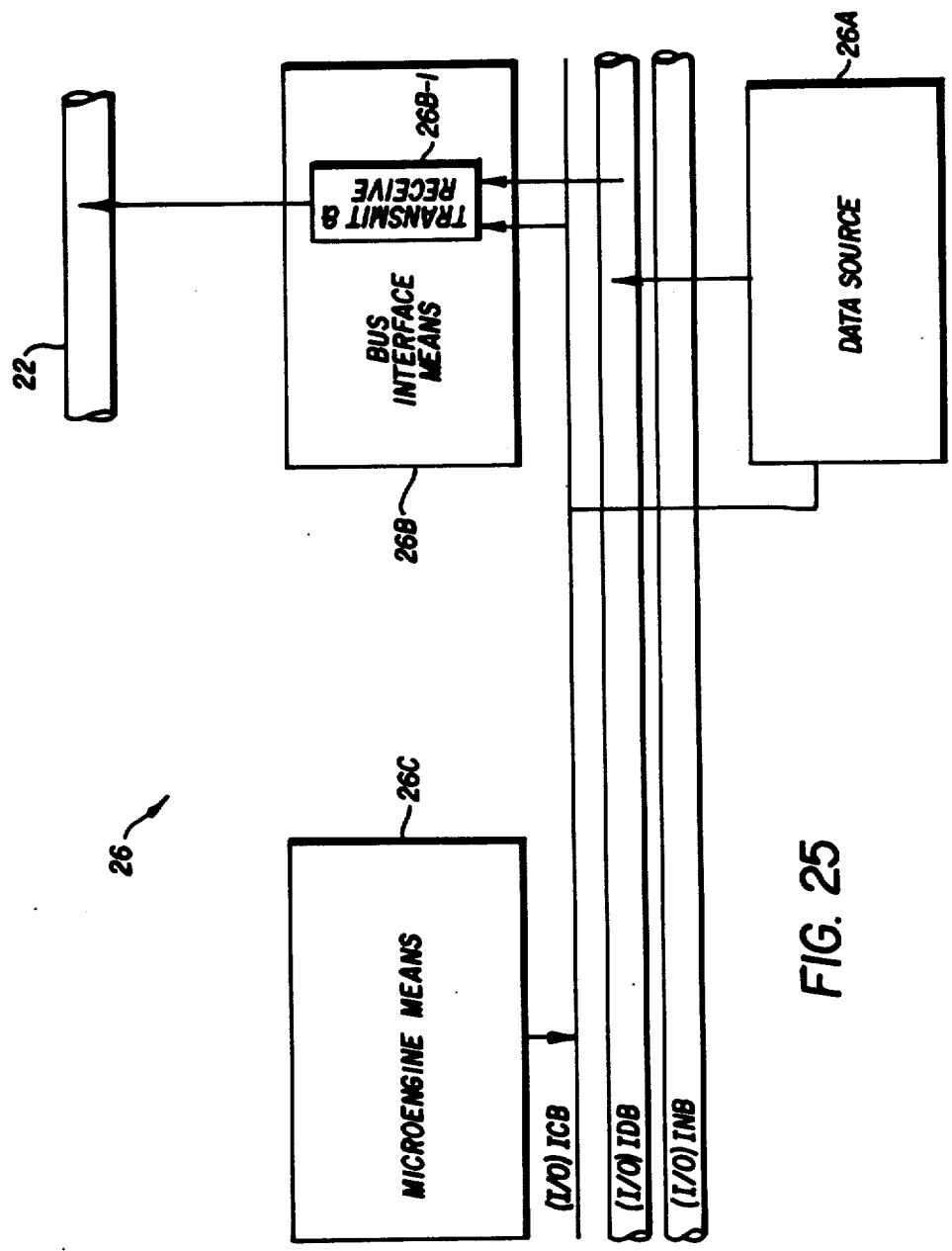
FIG. 25 shows another type of processor means of the present invention.

FIG. 25 illustrates in more detail the I/O processor 26 for processing the bus transaction WRITE NEW DATA, including the ARB GROUP, the INFO GROUP and the ACK GROUP shown in FIG. 4E. Processor 26 is simplified relative to a processor GPP since it has been described as performing only the WRITE NEW DATA bus transaction. However, if processor 26 were, in addition to its data input and output functions, to perform other functions such as reading and writing the data D itself, then processor 26 would be designed similarly as a processor GPP to provide the other bus transactions.

Thus, to perform the WRITE NEW DATA, processor 26 includes a data source means 26A, a bus interface means 26B and a microengine means 26C which are in communication via an I/O internal data bus (I/O) IDB, an I/O internal address bus (I/O) IAB and an I/O internal control bus (I/O) ICB. Data source 26A is a source for new data D that are to be stored in shared memory SM, as well as addresses of the new data D. Bus interface means 26B has a transmit and receive path 26B-1, similar to path 34-1 of bus interface means 34 of a processor 34, which couples the internal data bus (I/O) IDB to the expansion bus 22. New data D and corresponding addresses PA are provided by data source 26A on bus (I/O) IDB and then coupled by path 26B-1 onto bus 22. Microengine means 26C controls the path 26B-1 via internal control bus (I/O) ICB to provide the ARB GROUP and INFO GROUP of FIG. 4E on bus 22 in response to a signal on the bus (I/O) ICB from data source 26A when the latter is ready to input new data D, and to receive the corresponding ACK GROUP.

Therefore, in operation, data source 26A will signal microengine means 26C when new data D are to be inputted. Thereafter, microengine means 26C controls data source 26A to transfer the new data D and corresponding addresses PA to path 26B-1 and controls path 26B-1 to initiate the bus transaction WRITE NEW DATA. This results, as previously described, in new data D being stored in shared memory SM with a usage mode of PUBLIC and copies of data in processors GPP corresponding to the addresses PA of the new data D being invalidated.

As shown in FIG. 4A, the bus 22 has a number of signal lines $L_1$ corresponding to the ARB GROUP. For example, and as disclosed more fully in the above-referenced co-pending patent application of the assignee of the present invention, the total number of signal lines $L_1$ can be nine to allow up to a total number of 64 processors GPP, I/O processors 26 and shared memory SM to connect to and arbitrate for the bus 22. Six signal lines $L_1$ carry a unique code (05:00) identifying a particular processor GPP, processor 26 or shared memory SM, two signal lines $L_1$ are used, respectively, if the arbitration for the bus 22 is being made to perform a READ RESPONSE or to perform one of the other bus transactions, and one signal line $L_1$ is used to hold the bus 22 for a number of consecutive time slots to complete the bus transaction.

The total number of signal lines $L_2$ of the INFO GROUP can be, for example, forty-one, as follows. Three lines $L_2$ can support the bus transaction commands (02:00) identifying the six bus transactions, thirty-two lines $L_2$ can support address/data (31:00) and six lines $L_2$ can be used for the RID (05:00).

The total number of signal lines L₃ of the ACK GROUP can be, for example, four, as follows. Two lines L₃ are used for CM-ACK and two lines L₃ are used for SM-ACK.

Finally, as indicated previously, the bus transaction READ REQUEST PUBLIC is initiated by a processor GPP for read only access to data D and the bus transaction READ REQUEST PRIVATE is initiated for read/write accesses to data D. One algorithm that may be used in accordance with the present invention for microengine means 38 to determine which READ REQUEST (PUBLIC or PRIVATE) to initiate may be based on commonly used data protection levels termed "read only pages" and "read/write pages" of data D. If access is desired by subsystem processor means 32 to a read/only page, then a READ REQUEST PUBLIC is initiated. If such access is desired to a read/write page, then a READ REQUEST PRIVATE is initiated. The information as to whether such access is desired to either such page can be stored in a conventional manner in the page table entry PTE shown in FIG. 17. This information is read by the microengine means 38 whose condition test logic 38-6 specifically tests this information to determine if the access sought is to a read only page or a read/write page. As a result of this test, the READ REQUEST PUBLIC or READ REQUEST PRIVATE is initiated.

Other aspects, objects and advantages of this invention can be obtained from a study of the drawing, the disclosure and the appended claims.

We claim:

1. A system for processing data partitioned into blocks of data, each block of data being identified by an address, comprising:
   (a) addressable main memory means for storing the blocks of data;
   (b) a plurality of processor means for accessing the blocks of data, each of said processor means having addressable secondary memory means for storing a number of the blocks of data;
   (c) bus means for intercoupling said plurality of processor means with said addressable main memory means and for intercoupling each one of said plurality of processor means with any other of said plurality of processor means; and
   (d) wherein only one of said addressable main memory means and said plurality of processor means is a current owner of an address of a block of data, wherein said current owner has the correct data for the owned address, wherein ownership of an address is dynamically changeable among said addressable main memory means and said plurality of processor means, and wherein an address of a block of data has associated with it usage mode information identifying the use that can be made of the block of data.

2. A system, according to claim 1, wherein said usage mode information identifies a public use, in which:
   (i) said addressable main memory means is the current owner of an address;
   (ii) said plurality of processor means may store in said addressable secondary memory means, respectively, valid copies of the data of the current owned address; and
   (iii) said addressable main memory means and said plurality of processor means cannot modify the data of the current owned address.

3. A system, according to claim 2, wherein said usage mode information identifies a private use, in which:
   (i) the current owner of an address can modify the data; and
   (ii) said addressable main memory means and said plurality of said processor means, other than the current owner, can have no valid copies of the data of the current owned address.

4. A system for processing data partitioned into blocks of data, each block of data being identified by an address, comprising:
   (a) addressable main memory means for storing the blocks of data;
   (b) a plurality of processor means for accessing the blocks of data, each of said processor means having addressable secondary memory means for storing a number of the blocks of data;
   (c) bus means for intercoupling said plurality of processor means with said addressable main memory means and for intercoupling each one of said plurality of processor means with any other of said plurality of processor means;
   (d) wherein only one of said addressable main memory means and said plurality of processor means is a current owner of an address of a block of data, wherein said current owner has the correct data for the owned address, wherein ownership of an address is dynamically changeable among said addressable main memory means and said plurality of processor means; and
   (e) wherein each address of a block of data includes usage mode information identifying a public use or a private use that can be made of the data, wherein
      (1) if the use is public then
         (i) said addressable main memory means is the current owner of an address;
         (ii) said plurality of processor means may store in said addressable secondary memory means, respectively, valid copies of the data of the current owned address; and
         (iii) said addressable main memory means and said plurality of processor means cannot modify the data of the current owned address,
      (2) if the use is private, then
         (i) the current owner of an address can modify the data; and
         (ii) said addressable main memory means and said plurality of processor means, other than the current owner, have no valid copies of the data of the current owned address; and
      (3) any and all copies of the data of an address have associated with it the usage mode information.

5. A system, according to claim 4, wherein said bus means supports a plurality of bus transactions including read request public, read request private, read response, write modified and write unmodified, and wherein each one of said plurality of processor means can generate command information for initiating said plurality of bus transactions on said bus, in which:
   (i) said read request public is initiated to acquire and read a copy of a block of data of an address;
   (ii) said read request private is initiated to acquire ownership of an address of a block of data and to modify the corresponding data of the address;
   (iii) said read response is initiated to respond to a read request public or a read request private of another of said plurality of processor means;

(iv) said write modified is initiated to transfer ownership of an address owned by said one processor means, and the corresponding data, to said addressable main memory means, said corresponding data having been modified by said one processor means; and (v) said write unmodified is initiated to transfer ownership of an address owned by said one processor means to said addressable main memory means, the corresponding data having not been modified by said one processor means.

6. A system, according to claim 5, wherein, for said write unmodified bus transaction, the corresponding data of the address being transferred is not transferred to said addressable main memory means.

7. A system, according to claim 5, further comprising input processor means for inputting new data of a block having an address to said addressable main memory means, wherein said bus means supports another bus transaction being write new data, and wherein said input processor means generates command information to initiate said write new data to transfer ownership of the address of the new data from the current owner to said addressable main memory means.

8. A system, according to claim 5, wherein, upon initiation of said read request public or said read request private by said one processor means, the current owner of the address generates an acknowledgement signal to commit a read response.

9. A system, according to claim 8, wherein, upon generation of the acknowledgement signal for said read request private, ownership of the address is transferred from the current owner to said one processor means, followed by said current owner initiating a read response to transfer the block of data of the address to said one processor means.

10. A system, according to claim 9, wherein said one processor means, after acquiring ownership of the address and prior to the transfer of the block of data of the address to said one processor means, generates a busy signal upon a read request public or read request private initiated by another of said plurality of processor means and corresponding to the owned address.

11. A system, according to claim 10, further comprising input processor means for inputting new data of a block having an address to said addressable main memory means, wherein said bus means supports another bus transaction being write new data, and wherein said input processor means generates command information to initiate said write new data to transfer ownership of the address of the new data from the current owner to said addressable main memory means.

12. A system, according to claim 11, wherein said one processor means, after initiating a read request private and acquiring ownership of the address, and prior to the transfer of the block of data of the address to said one processor means, immediately loses ownership of the address in response to an acknowledgement signal by said addressable main memory means to said write new data and thereafter invalidates the data being transferred upon receipt by said one processor means of the data.

13. A system, according to claim 11, wherein said one processor means, after initiating a read request public and prior to the transfer of the block of data of the address to said one processor means, and in response to an acknowledgement signal by said addressable main memory means to said write new data or said read request private, invalidates the data being transferred immediately upon receipt of the data.

14. A system, according to claim 11, wherein said one processor means has a copy of data of an address being public, and said one processor means invalidates said copy of said data in response to said read request private or said write new data.

15. A tightly-coupled computer system for processing data partitioned into blocks of data, each block of data being identified by a unique address, comprising:

(a) addressable main memory means for storing the blocks of data;

(b) a plurality of processor means for accessing the blocks of data, each of said processor means having addressable cache memory means for storing a number of the blocks of data, addresses of the number of blocks of data and a plurality of flags per block of data stored in said addressable cache memory means, a first of said plurality of flags being a usage mode flag identifying if the corresponding address is public or private, a second of said plurality of flags being a modify flag identifying if the data of the corresponding block have been modified or are unmodified since being stored in said addressable cache memory means, and a third of said plurality of flags being a validity flag identifying if the data of the corresponding block are valid or invalid;

(c) bus means for intercoupling said plurality of processor means with said addressable main memory means and for intercoupling each one of said plurality of processor means with any other of said plurality of processor means;

(d) wherein only one of said addressable main memory means and said plurality of processor means is a current owner of an address of a block of data, wherein said current owner has the correct data for the owned address, and wherein ownership of an address is dynamically changeable among said addressable main memory means and said plurality of processor means;

(e) wherein, if said usage mode flag is public, then
   (i) said addressable main memory means is the current owner of an address;
   (ii) said plurality of processor means may store in said addressable cache memory means, respectively, valid copies of the data of the current owned address, and
   (iii) said addressable main memory means and said plurality of processor means cannot modify the corresponding block of data; and (f) wherein, if said usage mode flag is private, then
   (i) the current owner of an address can modify the data; and
   (ii) said addressable main memory means and said plurality of processor means, other than the current owner, can have no valid copies of the data of the current owned address.

16. A tightly-coupled computer system according to claim 15 wherein one of said plurality of processor means can communicate directly with another of said plurality of processor means to transfer a given block of data between each without transferring the given block of data to the addressable main memory means.

17. A tightly-coupled computer system, according to claim 15, wherein each one of said plurality of processor means comprises:

(a) processor subsystem means for accessing said number of blocks of data in said addressable cache memory means, said addressable cache memory means producing a cache status signal identifying a cache hit or a cache miss;

(b) bus interface means for monitoring a plurality of bus transactions occurring on said bus means and for producing a bus monitor status signal identifying the bus transactions; and (c) means, responsive to the cache miss status signal or the bus monitor status signal, for initiating any one of the plurality of bus transactions, including (i) a read request public to acquire and read a copy of a block of data of an address;

(ii) a read request private to acquire ownership of an address of a block of data and to modify the corresponding data of the address;

(iii) a read response to respond to a read request public or a read request private of another of said plurality of processor means;

(iv) a write modified to transfer ownership of an address owned by said one processor means, and the corresponding data, to said addressable main memory means, said corresponding data having been modified by said one processor means; and (v) a write unmodified to transfer ownership of an address owned by said one processor means to said addressable main memory means without transferring the corresponding data to said addressable main memory means, the corresponding data having not been modified by said one processor means.

18. A tightly-coupled computer system, according to claim 17, wherein, upon initiation of said read request public or said read request private by said one processor means, the current owner of the address generates an acknowledgement signal to commit a read response to said one processor means.

19. A tightly-coupled computer system, according to claim 18, wherein, upon the acknowledgment signal for said read request private, ownership of the address is transferred from the current owner to said one processor means.

20. A tightly-coupled computer system, according to claim 18, wherein, upon the acknowledgement signal for said read request public initiated by said one processor means, and prior to the transfer of the corresponding data to said one processor means, and upon receipt by said one processor means of a read request private initiated by another of said processor means prior to said transfer of the corresponding data, said one processor means writes said validity flag to invalidate the corresponding data.

21. A tightly-coupled computer system, according to claim 18, wherein said addressable cache memory means of said one processor means has a copy of data of an address being public, and wherein, upon receipt and acknowledgement by said one processor means of a read request private initiated by another of said processor means, said one processor means writes said validity flag to invalidate the copy of the data.

22. A tightly-coupled computer system, according to claim 18, further comprising input processor means for inputting new data of a block having an address to said addressable main memory means, wherein said bus means supports another bus transaction being a write new data, wherein said input processor means initiates said write new data upon inputting the new data, wherein said one processor means has an address corresponding to the new data, and wherein, in response to receipt by said one processor means of an acknowledgement signal of said write new data, said one processor means writes said validity flag to invalidate the data of the public address.

23. A tightly-coupled computer system, according to claim 22, wherein upon the acknowledgement signal for said read request private initiated by said one processor means, ownership of the address is immediately transferred by the current owner to said one processor means, followed by said current owner initiating a read response to transfer the corresponding data of the address to said one processor means.

24. A tightly-coupled computer system, according to claim 22, wherein, prior to the transfer of the corresponding data to said one processor means, and upon receipt by said one processor means of an acknowledgement of said write new data, said one processor means writes said validity flag to invalidate the corresponding data.

25. A tightly-coupled computer system, according to claim 22, wherein upon the acknowledgement signal for said read request public initiated by said one processor means, and prior to the transfer of the corresponding data to said one processor means, and upon receipt by said one processor means of an acknowledgement of said write new data prior to the transfer of the corresponding data, said one processor means writes said validity flag to invalidate the corresponding data.

26. A tightly-coupled computer system according to claim 18 wherein the current owner can generate a busy signal to require reinitiation of the read request public or read request private.

27. A single general purpose processor for connection to a computer system having an addressable main memory means for storing blocks of data, each block of data being identified by a unique address, at least one other general purpose processor, and an expansion bus supporting a plurality of bus transactions and intercoupling each said general purpose processor with each other said general purpose processor and for intercoupling each said general purpose processor with said addressable main memory means, said single general purpose processor comprising:

(a) addressable cache memory means for storing a number of said blocks of data and addresses of said number of blocks of data;

(b) subsystem processor means for accessing said addressable cache memory means to read or write data, said addressable cache memory means generating a cache status signal identifying a cache hit or a cache miss;

(c) bus interface means for coupling blocks of data between said addressable cache memory means and the expansion bus, said bus interface means including means for monitoring the plurality of bus transactions on the expansion bus and generating an expansion bus monitor status signal identifying the plurality of bus transactions; and (d) microengine means for initiating the plurality of bus transactions, respectively, in response to said cache miss status signal and in response to said expansion bus monitor status signal.

28. A single general purpose processor, according to claim 27, wherein only one of the addressable main memory means and each said general purpose processor is an owner of an address of a block of data and wherein ownership of an address of a block of data is dynamically changeable among the addressable main memory means and each said general purpose processor, and wherein said microengine means initiates command information identifying the plurality of bus transactions, said command information comprising:
 (a) a read request public to acquire a copy of, and read, a block data of an address for storage in said addressable cache memory means;
 (b) a read request private to acquire ownership of an address of a block of data and to modify the corresponding data to be stored in said addressable cache memory means;
 (c) a read response to respond to a read request public or read request private of another said general purpose processor;
 (d) a write modified to transfer ownership of an address owned by said single general purpose processor, and the corresponding data, to the adressable main memory means, said corresponding data having been modified by said sysbsystem processor means since being stored in said addressable cache memory means; and
 (e) a write unmodified to transfer ownership of an address owned by said single general purpose processor to the addressable main memory means, the corresponding data having not been modified by said subsystem processor means.

29. A single general purpose processor, according to claim 28, wherein said microengine means generates an address to acquire a corresponding block of data in response to the cache miss status signal.

30. A single general purpose processor, according to claim 27, wherein said subsystem processor means generates an address to access said addressable cache memory means.

31. A single general purpose processor, according to claim 30, wherein said addressable cache memory means comprises:
 (a) a cache memory for storing the blocks of data;
 (b) data cache tag means, responsive to the address generated by said subsystem processor means, for storing a number of addresses corresponding to the blocks of data of said cache memory; and
 (c) a control circuit, coupled to said data cache tag means, for controlling access to said cache memory, said cache control circuit generating said cache status signal.

32. A single general purpose processor, according to claim 27, wherein an address further has associated with it a validity flag identifying if corresponding data are valid or invalid, a modify flag identifying if corresponding data have been modified or have not been modified since being stored in said addressable cache memory means, and a usage mode flag identifying if the address is public or private, and wherein said microengine means includes means for writing said validity flag, said modified flag and said usage mode flag.

33. An expansion bus for supporting a plurality of bus transactions among an addressable main memory means for storing blocks of data and a plurality of processor means for processing the data, each of said plurality of processor means having a secondary memory means for storing a number of blocks of the data, said addressable main memory means and one or more of said plurality of processor means being connected to said expansion bus, each block of data having associated with it an address and a public or private usage mode identifying the use that can be made of the data, said expansion bus carrying command data identifying said plurality of bus transactions, said command data comprising:
 (a) a read request public being a bus transaction for acquiring and reading the data;
 (b) a read request private being a bus transaction for acquiring and modifying the data;
 (c) a read response being a bus transaction for responding to a read request public or a read request private;
 (d) a write modified being a bus transaction for transferring modified data of an address to the addressable main memory means; and
 (e) a write unmodified being a bus transaction for transferring ownership of an address to the addressable main memory means.

34. An expansion bus, according to claim 33, further comprising a write new data being a bus transaction for writing new data to, and transferring ownership of an address to, the addressable main memory means.

35. An expansion bus, according to claim 33, wherein each of said plurality of bus exchanges is unidirectional among the plurality of processor means and the addressable main memory means.

36. An expansion bus, according to claim 33, wherein each of said plurality of bus transactions is performed over time slots.

37. An expansion bus, according to claim 36, wherein said read request public comprises a read address being bussed over one time slot.

38. An expansion bus, according to claim 36, wherein said read request private comprises a read address being bussed over one time slot.

39. An expansion bus, according to claim 36, wherein said read response comprises data being bussed over a plurality of consecutive time slots.

40. An expansion bus, according to claim 26, wherein said write modified comprises a write address being bussed over one time slot followed beginning at the next time slot by data being bussed over a plurality of consecutive time slots.

41. An expansion bus, according to claim 36, wherein said write unmodified comprises a write address being bussed over one time slot.

42. An expansion bus, according to claim 36, wherein said write new data comprises a write address being bussed over one time slot followed beginning at the next time slot by data being bussed over a plurality of consecutive time slots.

43. An expansion bus for supporting communication among an addressable main memory means for storing data and a plurality of processor means for processing blocks of data, each of said plurality of processor means having a secondary memory means for storing the data, said addressable main memory means and one or more of said plurality of processor means being connected to the expansion bus, each block of data having associated with it a usage mode identifying the use that can be made of the block of data, said expansion bus carrying three functional groups of signals being transmitted during relative time slots, said three functional groups including:
 (a) an arbitration group of signals for enabling any one of the plurality of processor means to request and acquire said expansion bus;
 (b) an information group of signals for enabling any of the plurality of processor means to perform any of a plurality of bus transactions, including (i) a read request public being a bus transaction for acquiring and reading the data;
(ii) a read request private being a bus transaction for acquiring and modifying the data;
(iii) a read response being a bus transaction for responding to a read request public or a read request private;
(iv) a write modified being a bus transaction for transferring modified data of an address to the addressable main memory means; and
(v) a write unmodified being a bus transaction for transferring ownership of an address to the addressable main memory means; and
(c) an acknowledge group of signals for acknowledgement receipt of said information group.

44. An expansion bus, according to claim 42, wherein said relative time slots are such that said information group is provided over a time slot n, said arbitration group is provided over a time slot n−1, and said acknowledge group is provided over a time slot n+2.

45. An expansion bus, according to claim 43, wherein said information group comprises command data identifying any one of said plurality of bus transactions.

46. An expansion bus, according to claim 43, wherein said acknowledge group comprises a first acknowledge signal being producable by the addressable main memory means and a second acknowledge signal being producable by any of the plurality of processor means.

47. An expansion bus, according to claim 43, for further supporting communication between the addressable main memory means and an input processor means for inputting new data to the addressable main memory means, and wherein said plurality of bus transactions of said information group further comprises a write new data being a bus transaction for writing new data to, and transferring ownership of an address to, the addressable main memory means.

48. A processor for connection to a bus carrying plurality of bus transactions, comprising:
(a) means for producing a read request public bus transaction to acquire and read data;
(b) means for producing a read request private bus transaction to acquire ownership of and modify data;
(c) means for producing a read response bus transaction to respond to a read request public or private bus transaction of another said processor;
(d) means for producing a write modified bus transaction to relinquish ownership of and transfer modified data onto the bus; and
(e) means for producing a write unmodified bus transaction to relinquish ownership of unmodified data without transferring the unmodified data onto the bus.

49. A processor, according to claim 48, wherein said processor is a general purpose processor.

* * * * *

US004622631B1

REEXAMINATION CERTIFICATE (2835th)

United States Patent [19]

Frank et al.

[11] B1 4,622,631

[45] Certificate Issued Apr. 9, 1996

[54] DATA PROCESSING SYSTEM HAVING A DATA COHERENCE SOLUTION

[75] Inventors: Steven J. Frank, Mountain View; J. Scott Merritt, Newark, both of Calif.

[73] Assignee: Recognition International Inc., Irving, Tex.

Reexamination Request:
No. 90/002,471, Oct. 8, 1991

Reexamination Certificate for:
Patent No.: 4,622,631
Issued: Nov. 11, 1986
Appl. No.: 567,233
Filed: Dec. 27, 1983

[51] Int. Cl.$^6$ .................................................. G06F 15/16
[52] U.S. Cl. .................. 395/800; 364/228.1; 364/228.3; 364/228.5; 364/238.4; 364/DIG. 1; 364/228.9; 364/228.7; 364/240.8; 364/243; 364/243.4; 364/243.41; 364/243.44; 364/254; 364/254.3; 364/285; 364/285.4; 395/447
[58] Field of Search .................................. 395/800, 425, 395/447

[56] References Cited

U.S. PATENT DOCUMENTS

| | | | |
|---|---|---|---|
| 4,100,601 | 7/1978 | Kaufman | 395/275 |
| 4,394,731 | 7/1983 | Flusche et al. | 364/200 |
| 4,400,770 | 8/1983 | Chan et al. | 364/200 |
| 4,426,681 | 1/1984 | Bacot et al. | 364/200 |

OTHER PUBLICATIONS

Shared Cache for Multiple-Stream Computer Systems by Phil C. C. Yeh et. al., IEEE Trans. on Computers. vol. C-32, No. 1 Jan. 1983 pp. 38-47.

Effects of Cache Coherency in Multiprocessors by Michel Dubois et. al., IEEE Trans. on Computers vol. C-31, No. 11, Nov. 1982 pp. 1083-1099.

Cache Coherency Without Line Exclusivity in MP Systems Having Store-In Caches by J. H. Pomerene et. al., IBM Tech Discl. Bul. vol. 26, No. 6, Nov. 1983.

Censier, Lucien M. and Feautrier, Paul, "A New Solution to Coherence Problems in Multicache Systems", *IEEE Transactions on Computers*, vol. C-27, No. 12, Dec. 1978, pp. 1112-1118.

Inselberg, Armond, D., "Multiprocessor architecture ensures fault-tolerant transaction processing", *Mini-Micro Systems*, vol. 16, No. 4, Apr. 1983, pp. 165-172.

Smith, Alan Jay, "Cache Memories", *Computer Surveys*, vol. 14, No. 3, Sep. 1982, pp. 473-529.

*Primary Examiner*—Eric Coleman

[57] ABSTRACT

A tightly coupled computer system which provides for data coherency and includes an addressable main memory for storing blocks of data, a plurality of processors for accessing the blocks of data, each of the processors having an addressable cache memory for storing a number of blocks of data, a bus for intercoupling the plurality of processors with the addressable main memory and for intercoupling each of the plurality of processors with any other of the plurality of processors, and wherein only one of the plurality of processors and addressable main memory is a current owner of an address of a block of data, wherein the current owner has the correct data for the owned address, and wherein the ownership of an address is dynamically changeable among the addressable main memory and the plurality of processors.

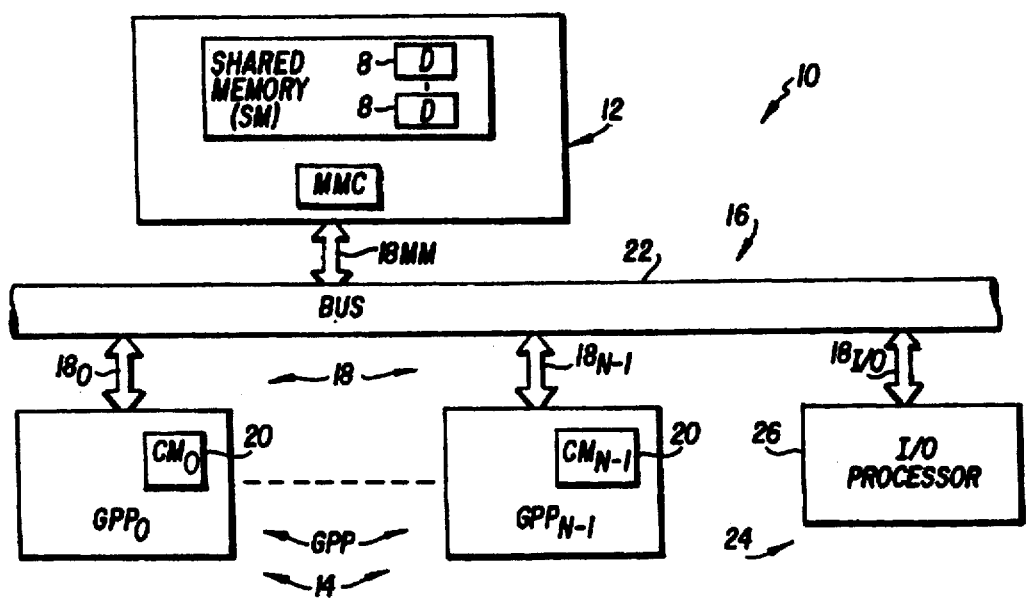

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4, 15, 16, 27–29 are cancelled.

Claims 5, 17 are determined to be patentable as amended.

Claims 6–14 and 18–26, dependent on an amended claim, are determined to be patentable.

5. A system, according to claim 4, wherein said bus means supports a plurality of bus transactions including: read request public, read request private, read response, write modified and write unmodified, and wherein each one of said plurality of processor means can generate command information for initiating said plurality of bus transactions on said bus, in which:
 (i) said read request public is initiated to acquire and read a copy of a block of data of an address;
 (ii) said read request private is initiated to acquire ownership of an address of a block of data and to modify the corresponding data of the address;
 (iii) said read response is initiated to respond to a read request public or a read request private of another of said plurality of processor means;
 (iv) said write modified is initiated to transfer ownership of an address owned by said one processor means, and the corresponding data, to said addressable main memory means, said corresponding data having been modified by said one processor means; and
 (v) said write unmodified is initiated to transfer ownership of an address owned by said one processor means to said addressable main memory means, the corresponding data having not been modified by said one processor means.

17. A tightly-coupled computer system, according to claim 15, wherein each one of said plurality of processor means comprises:
 (a) processor subsystem means for accessing said number of blocks of data in said addressable cache memory means, said addressable cache memory means producing a cache status signal identifying a cache hit or a cache miss;
 (b) bus interface means for monitoring a plurality of bus transactions occurring on said bus means and for producing a bus monitor status signal identifying the bus transactions; and
 (c) means, responsive to the cache miss status signal or the bus monitor status signal, for initiating any one of the plurality of bus transactions, including:
  (i) a read request public to acquire and read a copy of a block of data of an address;
  (ii) a read request private to acquire ownership of an address of a block of data and to modify the corresponding data of the address;
  (iii) a read response to respond to a read request public or a read request private of another of said plurality of processor means;
  (iv) a write modified to transfer ownership of an address owned by said one processor means, and the corresponding data, to said addressable main memory means, said corresponding data having been modified by said one processor means; and
  (v) a write ummodified to transfer ownership of an address owned by said one processor means to said addressable main memory means without transferring the corresponding data to said addressable main memory means, the corresponding data having not been modified by said one processor means.

* * * * *